United States Patent
Kailey et al.

(10) Patent No.: US 12,075,016 B1
(45) Date of Patent: Aug. 27, 2024

(54) REORDERED MULTIBIT HALFTONE PROCESSING WITH A THRESHOLD ARRAY

(71) Applicants: Walter F. Kailey, Frederick, CO (US); Florin Neagu, Timisoara (RO); Claudiu Attila Balogh, Timisoara (RO); Bogdan Lile, Timisoara (RO); Dan Dudas, Timisoara (RO)

(72) Inventors: Walter F. Kailey, Frederick, CO (US); Florin Neagu, Timisoara (RO); Claudiu Attila Balogh, Timisoara (RO); Bogdan Lile, Timisoara (RO); Dan Dudas, Timisoara (RO)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/536,001

(22) Filed: Dec. 11, 2023

(51) Int. Cl.
*H04N 1/40* (2006.01)
*G06K 15/02* (2006.01)
*G06T 7/11* (2017.01)

(52) U.S. Cl.
CPC ..... *H04N 1/40087* (2013.01); *G06K 15/1817* (2013.01); *G06K 15/1822* (2013.01); *G06T 7/11* (2017.01); *G06T 2207/20021* (2013.01)

(58) Field of Classification Search
CPC .............. H04N 1/40087; G06T 7/11; G06T 2207/20021; G06K 15/1817; G06K 15/1822
See application file for complete search history.

(56) References Cited

U.S. PATENT DOCUMENTS

| | | | | |
|---|---|---|---|---|
| 5,196,942 A | * | 3/1993 | Shiau | H04N 1/40087 358/3.1 |
| 5,615,021 A | * | 3/1997 | Lin | H04N 1/4055 358/3.1 |
| 5,689,586 A | * | 11/1997 | Lin | H04N 1/40087 382/232 |
| 7,236,268 B2 | | 6/2007 | Rao et al. | |
| 7,580,156 B2 | * | 8/2009 | Kakutani | H04N 1/40087 358/3.21 |
| 8,027,053 B2 | | 9/2011 | Shoen | |
| 8,363,251 B2 | | 1/2013 | Watanabe et al. | |

(Continued)

FOREIGN PATENT DOCUMENTS

| | | |
|---|---|---|
| JP | 2007174060 A | 7/2007 |
| JP | 5064415 B2 | 10/2012 |

(Continued)

*Primary Examiner* — Scott A Rogers
(74) *Attorney, Agent, or Firm* — Duft & Bornsen, PC

(57) ABSTRACT

Systems, methods, and software for halftoning. In an embodiment, a halftone system is configured to store a threshold array comprising an array of threshold elements. The halftone system is further configured to receive a source image comprising an array of pixels with pixel values, and perform a multi-level halftoning process on the source image by partitioning the source image into a sequence of image segments, partitioning the threshold array into a plurality of threshold segments, identifying image segment groups each comprising a set of the image segments that are noncontiguous in the sequence and correspond with a mutual threshold segment of the threshold array, and schedule processing of the image segments in an image segment group as a batch based on the mutual threshold segment.

20 Claims, 27 Drawing Sheets

(56) References Cited

U.S. PATENT DOCUMENTS

| | | |
|---|---|---|
| 8,384,959 B2 | 2/2013 | Asai |
| 8,463,038 B2 | 6/2013 | Sakai et al. |
| 8,472,035 B2 | 6/2013 | Nakamaru |
| 8,553,287 B2 * | 10/2013 | Yasutomi ............ H04N 1/4058 358/3.21 |
| 8,810,851 B2 | 8/2014 | Kuno |
| 8,830,529 B2 | 9/2014 | Ozawa et al. |
| 8,848,251 B2 | 9/2014 | Puigardeu et al. |
| 8,941,844 B2 | 1/2015 | Kodama et al. |
| 9,132,632 B2 | 9/2015 | Kakutani et al. |
| 9,147,262 B1 | 9/2015 | Li et al. |
| 9,171,239 B2 | 10/2015 | Prenn et al. |
| 9,349,083 B2 | 5/2016 | Kikuta |
| 9,454,720 B2 | 9/2016 | Donovan et al. |
| 9,501,019 B2 | 11/2016 | Haruta et al. |
| 9,815,298 B2 | 11/2017 | Haramoto et al. |
| 9,875,434 B2 | 1/2018 | Blank et al. |
| 9,876,938 B2 | 1/2018 | Ichihashi et al. |
| 9,886,220 B1 | 2/2018 | Dellert et al. |
| 9,891,875 B2 | 2/2018 | Kim et al. |
| 9,921,786 B2 | 3/2018 | Kobayashi et al. |
| 10,110,778 B2 | 10/2018 | Yoshikawa et al. |
| 10,726,539 B2 | 7/2020 | Hori et al. |
| 10,757,297 B2 | 8/2020 | Kakutani et al. |
| 10,798,266 B2 | 10/2020 | Kakutani et al. |
| 10,872,280 B2 | 12/2020 | Jung et al. |
| 10,949,942 B2 | 3/2021 | Takemoto et al. |
| 11,388,312 B2 | 7/2022 | Kakutani et al. |
| 11,436,455 B2 | 9/2022 | Kawai et al. |
| 2021/0183067 A1 | 6/2021 | Itagaki et al. |
| 2022/0256053 A1 | 8/2022 | Bartels |

FOREIGN PATENT DOCUMENTS

| | | |
|---|---|---|
| JP | 5090526 B2 | 12/2012 |
| JP | 5104913 B2 | 12/2012 |
| JP | 5222227 B2 | 6/2013 |
| JP | 2010017274 A | 7/2014 |
| JP | 2011172027 A | 9/2014 |
| JP | 5611841 B2 | 10/2014 |
| JP | 5825779 B2 | 12/2015 |
| JP | 6123356 B2 | 5/2017 |
| JP | 6132209 B2 | 5/2017 |
| JP | 6186790 B2 | 8/2017 |
| JP | 2018017673 A | 2/2018 |
| JP | 2018052088 A | 4/2018 |
| JP | 2020005155 A | 1/2020 |
| JP | 6676996 B2 | 4/2020 |
| JP | 2020071410 A | 5/2020 |
| JP | 6843487 B2 | 3/2021 |
| JP | 6844248 B2 | 3/2021 |
| JP | 6846232 B2 | 3/2021 |
| JP | 2021074959 A | 5/2021 |
| JP | 7031701 B2 | 3/2022 |
| JP | 2022038519 A | 3/2022 |
| JP | 7047311 B2 | 4/2022 |
| JP | 2022086454 A | 6/2022 |
| JP | 2020049662 A | 7/2022 |
| JP | 7212466 B2 | 1/2023 |
| JP | 7222665 B2 | 2/2023 |
| JP | 7230444 B2 | 3/2023 |
| JP | 2023518041 A | 4/2023 |
| WO | 2020059551 A1 | 3/2020 |

* cited by examiner

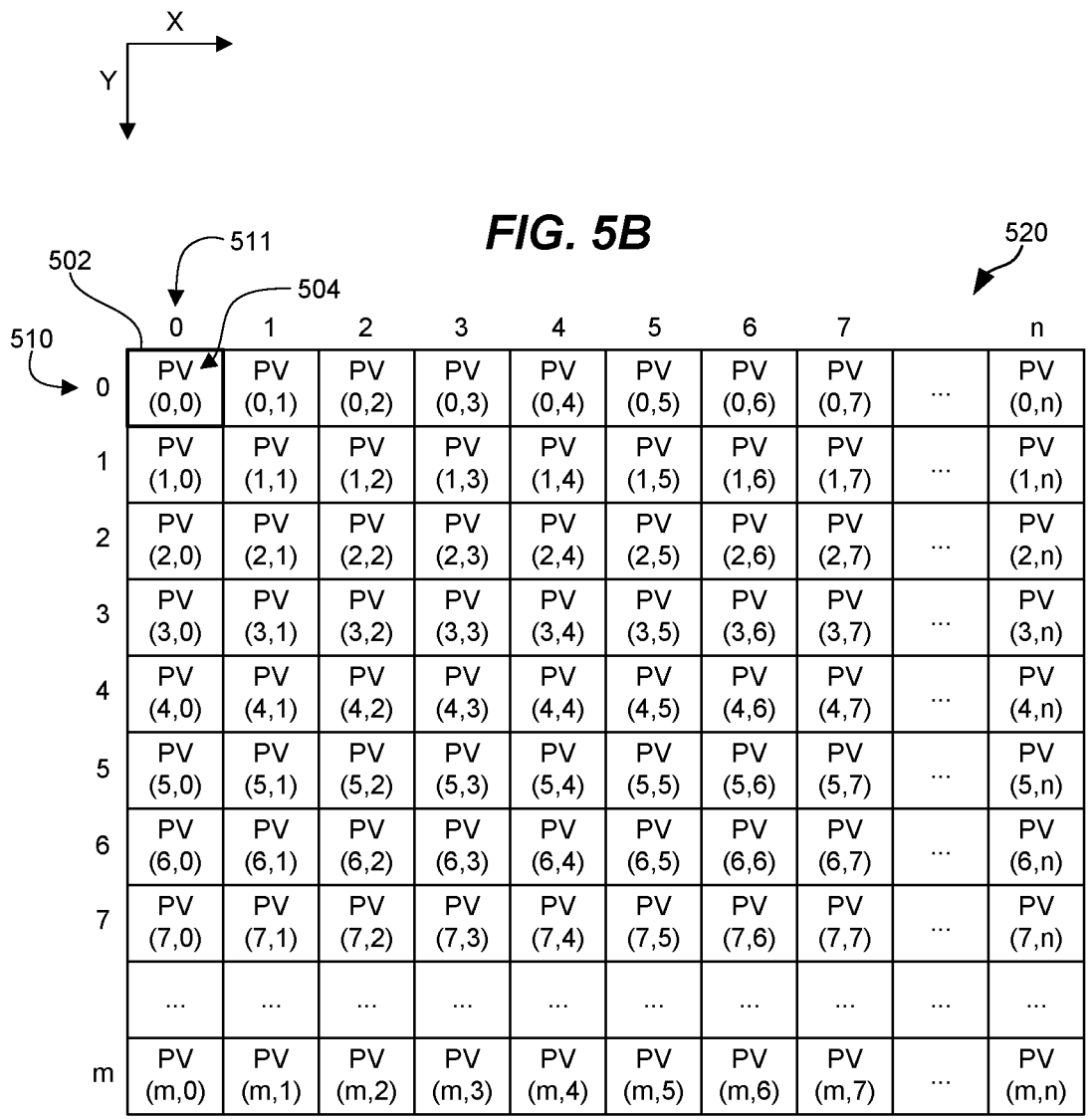

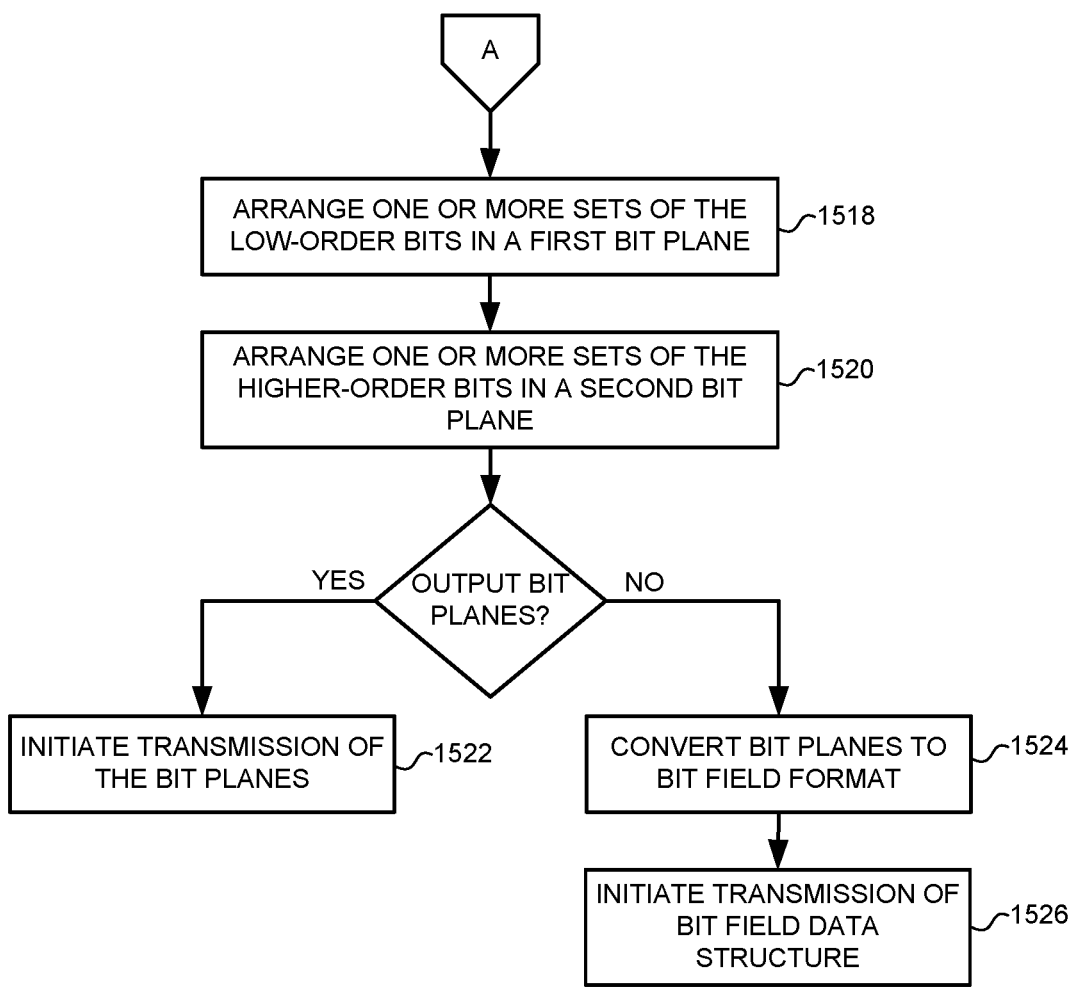

FIG. 16

| | 0 | 1 | 2 | 3 | 4 | 5 | 6 | 7 | | n |
|---|---|---|---|---|---|---|---|---|---|---|
| 0 | PV(0,0) | PV(0,1) | PV(0,2) | PV(0,3) | PV(0,4) | PV(0,5) | PV(0,6) | PV(0,7) | ... | PV(0,n) |
| 1 | PV(1,0) | PV(1,1) | PV(1,2) | PV(1,3) | PV(1,4) | PV(1,5) | PV(1,6) | PV(1,7) | ... | PV(1,n) |
| 2 | PV(2,0) | PV(2,1) | PV(2,2) | PV(2,3) | PV(2,4) | PV(2,5) | PV(2,6) | PV(2,7) | ... | PV(2,n) |
| 3 | PV(3,0) | PV(3,1) | PV(3,2) | PV(3,3) | PV(3,4) | PV(3,5) | PV(3,6) | PV(3,7) | ... | PV(3,n) |
| 4 | PV(4,0) | PV(4,1) | PV(4,2) | PV(4,3) | PV(4,4) | PV(4,5) | PV(4,6) | PV(4,7) | ... | PV(4,n) |
| ... | ... | ... | ... | ... | ... | ... | ... | ... | | ... |

FIG. 17

| | 0 | 1 | 2 | 3 | 4 | 5 | 6 | 7 | | n |
|---|---|---|---|---|---|---|---|---|---|---|
| 0 | TH | TH | TH | TH | TH | TH | TH | TH | ... | TH |
| 1 | TH | TH | TH | TH | TH | TH | TH | TH | ... | TH |
| 2 | TH | TH | TH | TH | TH | TH | TH | TH | ... | TH |
| 3 | TH | TH | TH | TH | TH | TH | TH | TH | ... | TH |
| 4 | TH | TH | TH | TH | TH | TH | TH | TH | ... | TH |
| ... | ... | ... | ... | ... | ... | ... | ... | ... | | ... |

| | 0 | 1 | 2 | 3 | 4 | 5 | 6 | 7 | |
|---|---|---|---|---|---|---|---|---|---|
| 0 | LOB (0,0) | LOB (0,1) | LOB (0,2) | LOB (0,3) | LOB (0,4) | LOB (0,5) | LOB (0,6) | LOB (0,7) | ... |
| 1 | LOB (1,0) | LOB (1,1) | LOB (1,2) | LOB (1,3) | LOB (1,4) | LOB (1,5) | LOB (1,6) | LOB (1,7) | ... |
| 2 | LOB (2,0) | LOB (2,1) | LOB (2,2) | LOB (2,3) | LOB (2,4) | LOB (2,5) | LOB (2,6) | LOB (2,7) | ... |
| 3 | LOB (3,0) | LOB (3,1) | LOB (3,2) | LOB (3,3) | LOB (3,4) | LOB (3,5) | LOB (3,6) | LOB (3,7) | ... |
| 4 | LOB (4,0) | LOB (4,1) | LOB (4,2) | LOB (4,3) | LOB (4,4) | LOB (4,5) | LOB (4,6) | LOB (4,7) | ... |
| 5 | LOB (5,0) | LOB (5,1) | LOB (5,2) | LOB (5,3) | LOB (5,4) | LOB (5,5) | LOB (5,6) | LOB (5,7) | ... |
| 6 | LOB (6,0) | LOB (6,1) | LOB (6,2) | LOB (6,3) | LOB (6,4) | LOB (6,5) | LOB (6,6) | LOB (6,7) | ... |
| 7 | LOB (7,0) | LOB (7,1) | LOB (7,2) | LOB (7,3) | LOB (7,4) | LOB (7,5) | LOB (7,6) | LOB (7,7) | ... |
| | ... | ... | ... | ... | ... | ... | ... | ... | ... |

FIG. 26

| | 0 | 1 | 2 | 3 | 4 | 5 | 6 | 7 | |
|---|---|---|---|---|---|---|---|---|---|
| 0 | HOB (0,0) | HOB (0,1) | HOB (0,2) | HOB (0,3) | HOB (0,4) | HOB (0,5) | HOB (0,6) | HOB (0,7) | ... |
| 1 | HOB (1,0) | HOB (1,1) | HOB (1,2) | HOB (1,3) | HOB (1,4) | HOB (1,5) | HOB (1,6) | HOB (1,7) | ... |
| 2 | HOB (2,0) | HOB (2,1) | HOB (2,2) | HOB (2,3) | HOB (2,4) | HOB (2,5) | HOB (2,6) | HOB (2,7) | ... |
| 3 | HOB (3,0) | HOB (3,1) | HOB (3,2) | HOB (3,3) | HOB (3,4) | HOB (3,5) | HOB (3,6) | HOB (3,7) | ... |
| 4 | HOB (4,0) | HOB (4,1) | HOB (4,2) | HOB (4,3) | HOB (4,4) | HOB (4,5) | HOB (4,6) | HOB (4,7) | ... |
| 5 | HOB (5,0) | HOB (5,1) | HOB (5,2) | HOB (5,3) | HOB (5,4) | HOB (5,5) | HOB (5,6) | HOB (5,7) | ... |
| 6 | HOB (6,0) | HOB (6,1) | HOB (6,2) | HOB (6,3) | HOB (6,4) | HOB (6,5) | HOB (6,6) | HOB (6,7) | ... |
| 7 | HOB (7,0) | HOB (7,1) | HOB (7,2) | HOB (7,3) | HOB (7,4) | HOB (7,5) | HOB (7,6) | HOB (7,7) | ... |
| | ... | ... | ... | ... | ... | ... | ... | ... | ... |

*FIG. 27*

REORDERED MULTIBIT HALFTONE PROCESSING WITH A THRESHOLD ARRAY

TECHNICAL FIELD

This disclosure relates to the field of image formation, and more particularly, to halftoning of source images.

BACKGROUND

Halftoning is a technique for simulating a continuous tone image on a two-dimensional medium with a pattern of dots varying in a limited number of sizes and/or spacings. A reproduction of a halftoned image appears to consist of many colors or grays when viewed from a proper distance. For example, a halftoned image comprised of black and white dots may appear to display various gray levels. Earlier-generation printers had a coarse resolution, and were limited to image reproduction in two color levels (i.e., pixels were either marked with a color or left blank). A halftoning technique for these types of printers is commonly referred to as bi-level halftoning, which produces a halftoned image with pixel values defined by one bit. Printers have evolved to accommodate finer resolutions with multiple intensity levels. For such printers, a multi-level or multi-bit halftoning technique may be used to produce a halftoned image with pixel values defined by multiple bits (e.g., two-bits, three-bits, etc.). Multi-level halftoning produces better perceived fidelity to the original image at lower spatial resolution as compared to bi-level halftoning. However, multi-level halftoning may be computationally expensive.

SUMMARY

Provided herein are a halftone system, method, and software for multi-level halftoning. As an overview, a halftone system as described herein processes pixel values of a source image by comparing the pixel values to threshold values of a threshold array. The halftone system segments a source image into a sequence of image segments that span the width of the source image. When the threshold array is replicated over the source image, noncontiguous image segments in the source image will be mapped to common portions of the threshold array. Thus, the halftone system processes the image segments "out-of-order" in relation to the sequence so that the image segments corresponding to the same portion of the threshold array are processed together as a "unit". As the threshold array may be large, a portion of the threshold array may be fetched from main memory, and the image segments corresponding to that portion of the threshold array are processed together. One technical benefit is that multi-level halftoning is more computationally efficient, and can minimize cache misses associated with fetching threshold data.

In an embodiment, a halftone system comprises at least one processor, and a memory including computer program code executable by the processor. The memory is configured to store a threshold array comprising an array of threshold elements. The processor causes the halftone system at least to receive a source image comprising an array of pixels with pixel values, and perform a multi-level halftoning process on the source image by partitioning the source image into a sequence of image segments, partitioning the threshold array into a plurality of threshold segments, identifying image segment groups each comprising a set of the image segments that are noncontiguous in the sequence and correspond with a mutual threshold segment of the threshold array, and scheduling processing of the image segments in an image segment group as a batch based on the mutual threshold segment.

In an embodiment, a method of halftoning comprises storing, in memory, a threshold array comprising an array of threshold elements, receiving a source image comprising an array of pixels with pixel values, and performing a multi-level halftoning process on the source image by partitioning the source image into a sequence of image segments, partitioning the threshold array into a plurality of threshold segments, identifying image segment groups each comprising a set of the image segments that are noncontiguous in the sequence and correspond with a mutual threshold segment of the threshold array, and scheduling processing of the image segments in an image segment group as a batch based on the mutual threshold segment.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 5B illustrates an array of pixels defining a source image in an illustrative embodiment.

FIGS. 15A-15B depict a flowchart illustrating a method of processing an image segment in an illustrative embodiment.

FIG. 16 illustrates a block of pixels in an image segment in an illustrative embodiment.

FIG. 17 illustrates a block of threshold values from a threshold segment in an illustrative embodiment.

FIG. 24 illustrates computing of selector parameters in an illustrative embodiment.

FIGS. 25-26 illustrate bit planes that define pixel values for a halftoned image in an illustrative embodiment.

FIG. 27 illustrates a halftoned image with bit planes merged in an illustrative embodiment.

DETAILED DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
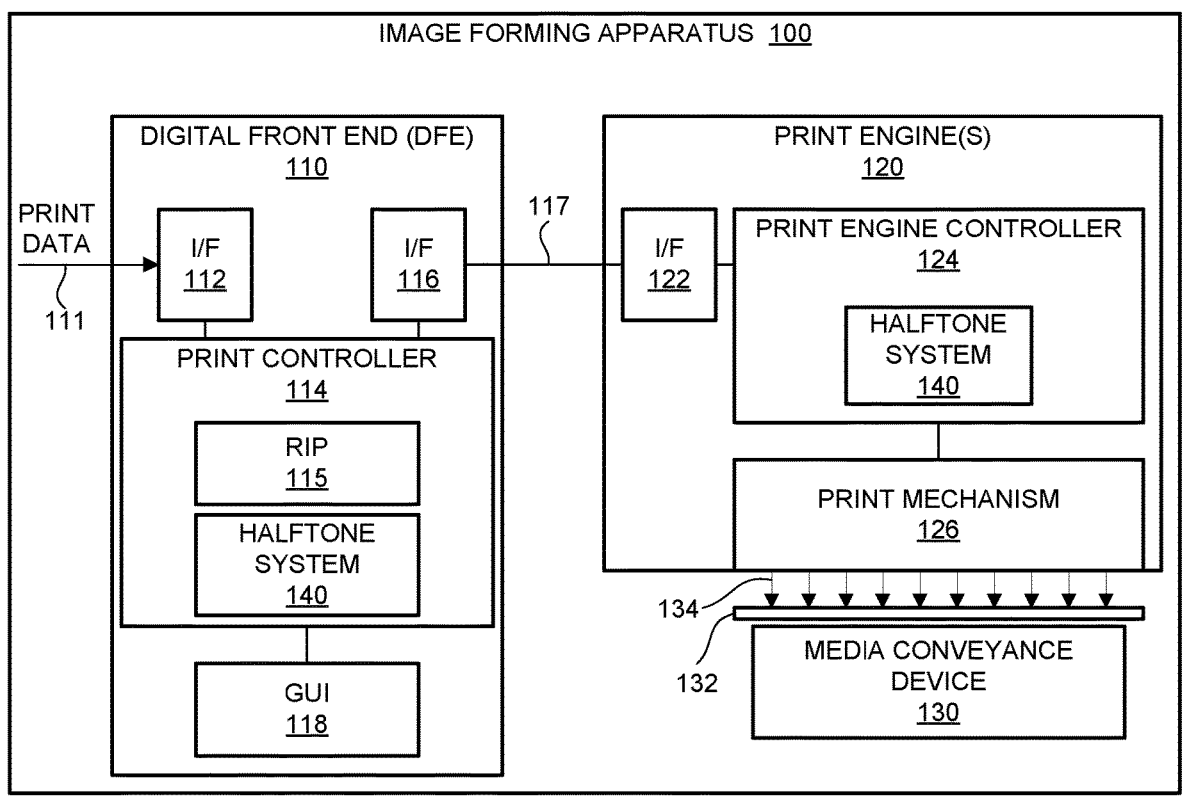
FIG. 1 is a schematic diagram of an image forming apparatus in an illustrative embodiment.

FIG. 1 is a schematic diagram of an image forming apparatus 100 in an illustrative embodiment. Image forming apparatus 100 is a type of device that executes an image forming process (e.g., printing) on a recording medium 132. Image forming apparatus 100 may comprise a continuous-form printer that prints on a web of continuous-form media, such as paper. Although a continuous-form printer is discussed, concepts described herein may also apply to alternative print systems, such as cut-sheet printers, wide format printers, 3D printers, etc.

In an embodiment, image forming apparatus 100 includes a Digital Front End (DFE) 110, one or more print engines 120, and a media conveyance device 130. DFE 110 comprises a device, circuitry, means, and/or other component configured to accept print data 111, and convert the print data 111 into a suitable format for print engine 120. DFE 110 includes an Input/Output (I/O) interface 112, a print controller 114, a print engine interface 116, and a Graphical User Interface (GUI) 118. I/O interface 112 comprises a device, circuitry, means, and/or other component configured to receive print data 111 from a source. For example, I/O interface 112 may receive the print data 111 from a host system (not shown), such as a personal computer, a server, etc., over a network connection, may receive print data 111 from an external memory, etc. Thus, I/O interface 112 may be considered a network interface in some embodiments. The print data 111 comprises a file, document, print job, etc., that is formatted with a Page Description Language (PDL), such as PostScript, Printer Command Language (PCL), Intelligent Printer Data Stream (IPDS), etc. Print controller 114 comprises a device, circuitry, means, and/or other component configured to transform the print data 111 into one or more digital images that may be used by print engine 120 to mark the recording medium 132 with ink, toner, or another recording or marking material. In an embodiment, print controller 114 includes a Raster Image Processor (RIP) 115 that rasterizes the print data 111 to generate digital images (e.g., source image 218 or raster image 220 as explained further below). A digital image comprises a two-dimensional array of pixels. Whereas the print data 111 in PDL format is a high-level description of the content (e.g., text, graphics, pictures, etc.), a digital image defines a pixel value or color value for each pixel in a display space. Print engine interface 116 comprises a device, circuitry, means, and/or other component configured to communicate with print engine 120, such as to transmit digital images to print engine 120. Print engine interface 116 is communicatively coupled to print engine 120 via a communication link 117 (e.g., a fiber link, a bus, etc.), and is configured to use a data transfer protocol to transfer the digital images to print engine 120. GUI 118 is a hardware component configured to interact with a human operator. GUI 118 may include a display, screen, touch screen, or the like (e.g., a Liquid Crystal Display (LCD), a Light Emitting Diode (LED) display, etc.). GUI 118 may include a keyboard or keypad, a tracking device (e.g., a trackball or trackpad), a speaker, a microphone, etc. A human operator may access GUI 118 to view status indicators, view or manipulate settings, schedule print jobs, etc.

Print engine 120 includes a DFE interface 122, a print engine controller 124, and a print mechanism 126. DFE interface 122 comprises a device, circuitry, means, and/or other component configured to interact with DFE 110, such as to receive digital images from DFE 110. Print engine controller 124 comprises a device, circuitry, means, and/or other component configured to process the digital images received from DFE 110, and provide control signals to print mechanism 126. Print mechanism 126 is a device or devices that mark the recording medium 132 with a recording material 134, such as ink. Print mechanism 126 is configured for variable droplet or dot size to reproduce multiple intensity levels, as opposed to a bi-level mechanism where a pixel is either "on" or "off". For example, if print mechanism 126 is an ink-jet device, then multiple intensity levels per pixel may be achieved by printing one, two, or several droplets at the same position or pixel area, or varying the size of a droplet. Recording medium 132 comprises any type of material suitable for printing upon which recording material 134 is applied, such as paper (web or cut-sheet), plastic, card stock, transparent sheets, a substrate for 3D printing, cloth, etc. In an embodiment, print mechanism 126 may include one or more printheads that are configured to jet or eject droplets of a print fluid, such as ink (e.g., water, solvent, oil, or UV-curable), through a plurality of orifices or nozzles. The orifices or nozzles may be grouped according to ink types (e.g., colors such as Cyan (C), Magenta (M), Yellow (Y), Key black (K) or formulas such as for pre-coat, image and protector coat), which may be referred to as color planes. In another embodiment, print mechanism 126 may include a drum that selectively collects electrically-charged powdered ink (toner), and transfers the toner to recording medium 132. Media conveyance device 130 is configured to move recording medium 132 relative to print mechanism 126. In other embodiments, portions of print mechanism 126 may be configured to move relative to recording medium 132. Image forming apparatus 100 may include various other components not specifically illustrated in FIG. 1.

In an embodiment, when RIP 115 rasterizes the print data 111, the output is a digital continuous tone image (i.e., contone image) where individual pixels are defined with pixel values that are a relatively large number of bits. For example, the digital continuous tone image may have 8-bit pixel values or larger. A digital continuous tone image generated by RIP 115 is referred to herein as a "raster image". An 8-bit pixel value may represent 256 different intensities of a color. However, a typical print mechanism (e.g., print mechanism 126) may not be capable of reproduction at 256 different levels. Thus, a halftoning process may be performed to define the individual pixels with lower multi-bit values, such as two-bits, three-bits, etc. A multi-level halftoning process (also referred to as an imaging process) produces output that defines pixel values in multiple bits, as opposed to a bi-level halftoning process. For example, a multi-level halftoning process may produce pixel values that are two-bits, three-bits, etc. FIG. 1 also illustrates a halftone system 140 implemented in print controller 114. Halftone system 140 comprises circuitry, logic, hardware, means, and/or other components configured to perform a multi-level halftoning process or imaging process on one or more source images (e.g., raster images), which is described in further detail below. Although halftone system 140 is shown as being implemented in print controller 114 of DFE 110, halftone system 140 may be implemented in print engine controller 124 (as shown in FIG. 1), in a host system or another system coupled to image forming apparatus 100, or in other systems.

Figure 2:
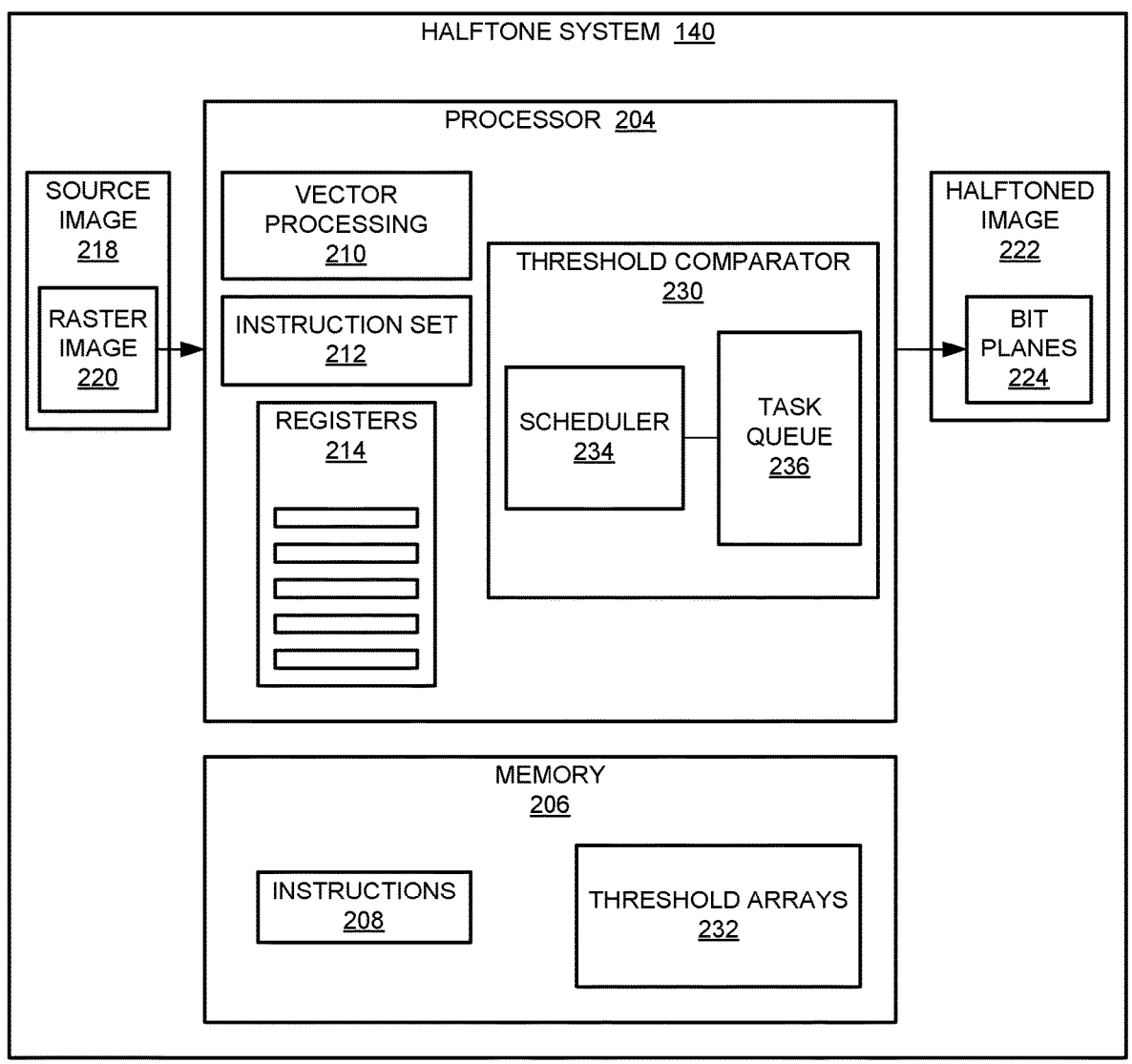
FIG. 2 is a schematic diagram of a halftone system in an illustrative embodiment.

FIG. 2 is a schematic diagram of halftone system 140 in an illustrative embodiment, which may also be referred to as an image processing system. For a multi-level halftoning process, halftone system 140 receives a source image 218 (e.g., a raster image 220) as input, and converts the source image 218 to a multi-bit halftoned image 222 that indicates pixel values with fewer bits than the source image 218. The pixel values of the multi-bit halftoned image 222 may be represented in bit planes 224. Halftone system 140 includes one or more processors 204 and a memory 206. Processor 204 represents the internal circuitry, logic, hardware, etc., that provides the functions of halftone system 140. Processor 204 may be configured to execute instructions 208 (i.e., computer program code) for software that are loaded into memory 206. Processor 204 may comprise a set of one or more processors or may comprise a multi-processor core, depending on the particular implementation. Memory 206 is a computer readable storage medium for data, instructions 208, applications, etc., and is accessible by processor 204. Memory 206 is a hardware storage device capable of storing information on a temporary basis and/or a permanent basis. Memory 206 may comprise volatile or non-volatile Random-Access Memory (RAM), Read-Only Memory (ROM), FLASH devices, volatile or non-volatile Static RAM (SRAM) devices, magnetic disk drives, Solid State Disks (SSDs), or any other volatile or non-volatile storage device.

In an embodiment, processor 204 implements a threshold comparator 230. Threshold comparator 230 comprises circuitry, logic, hardware, means, and/or other component configured to perform threshold comparisons of pixel values in source image 218 with thresholds of one or more threshold arrays 232 stored in memory 206. As will be described in more detail below, threshold comparator 230 is configured to tile or replicate portions of a threshold array 232 over segments of the source image 218. The portion of the threshold array 232 is therefore overlaid on the segment of the source image 218 so that pixels of the source image 218 are aligned or mapped to threshold values of the portion of the threshold array 232. Threshold comparator 230 may then perform a comparison of the pixel values to corresponding threshold values to generate a set of comparison bits. Threshold comparator 230 may repeat the threshold comparisons for different portions of the threshold array 232 and different segments of the source image 218. One technical benefit is processor 204 may load a portion of the threshold array 232 from memory 206 and into a local cache, and process the segments of the source image 218 that correspond with the portion of the threshold array 232 resulting in processing efficiency and/or minimized cache misses. The threshold array 232 may be quite large (e.g., ~100 MB per color), which may exceed the size of the local cache of the processor 204 by orders of magnitude. This advantageously minimizes cache misses associated with fetching threshold data.

Figure 3:
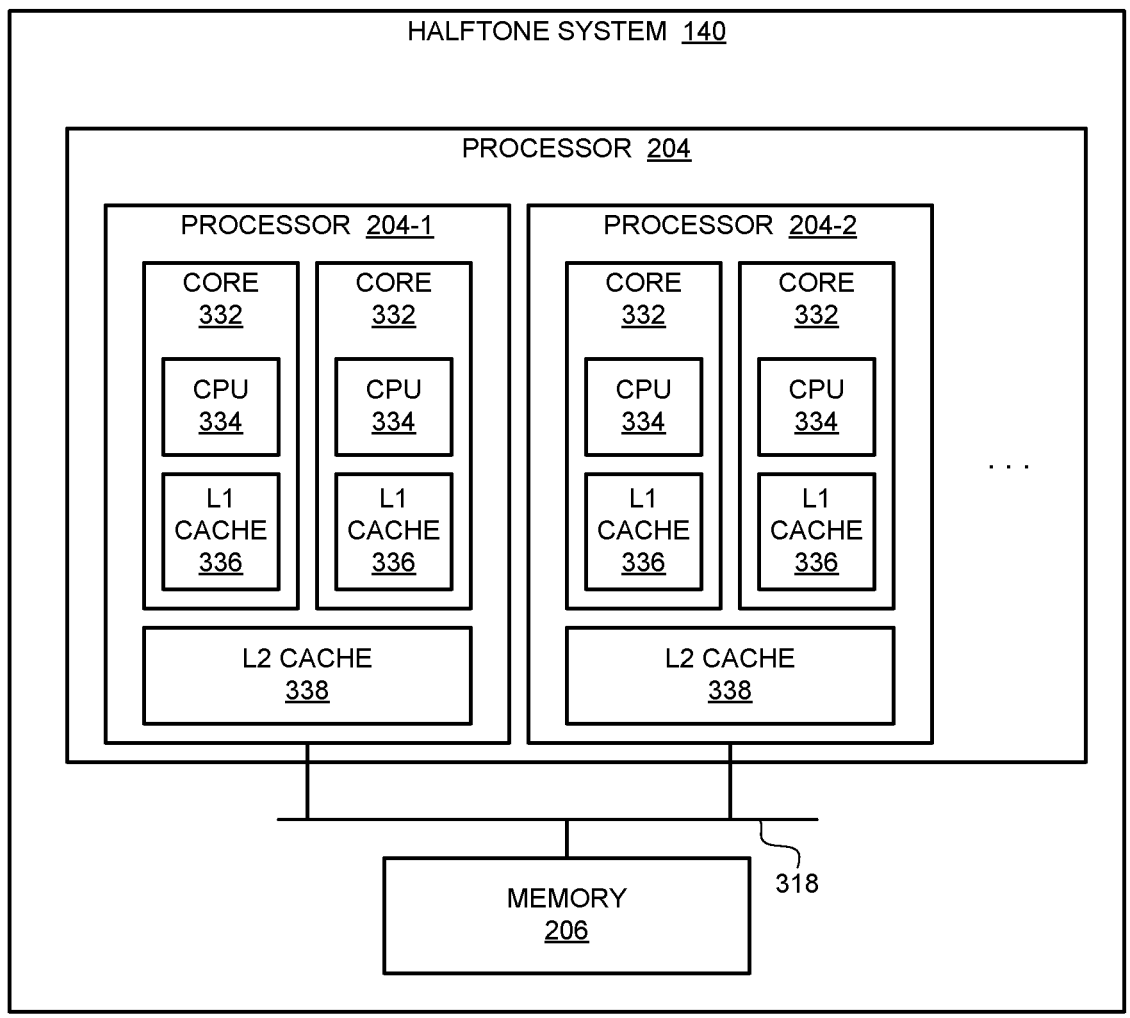
FIG. 3 illustrates an architecture of a processor in an illustrative embodiment.

FIG. 3 illustrates an architecture of processor 204 in an illustrative embodiment. In an embodiment, processor 204 comprises multiple processors 204-1, 204-2, etc., and each of the processors 204-1, 204-2 comprises one or more cores 332 (also referred to as processor cores) that include a Central Processing Unit (CPU) 334 and an L1 cache 336. Each of the processors 204-1, 204-2 further comprises an L2 cache 338. L1 cache 336 and/or L2 cache 338 may be referred to generally as cache memory. The first-level (L1) cache 336 typically provides a one-cycle or two-cycle access time, while the second-level (L2) cache 338 is larger than L1 cache 336 and typically has slower access time. Processors 204-1, 204-2 are configured to access memory 206 (also referred to as main memory) via system bus 318. The architecture shown in FIG. 3 is provided as an example, and may vary as desired. For example, a processor 204-1, 204-2 may include more than two cores 332.

In FIG. 2, processor 204 is configured for vector processing 210. Vector processing 210 is a type of processing that operates on sets of values called "vectors" at a time, as compared to operating on a single value. Processor 204 operates according to an instruction set 212. For example, processor 204 may comprise an Intel® Xeon processor or the like that operates based on instruction set 212. Processor 204 further includes registers 214 configured to temporarily store data for operations performed according to instruction set 212. For example, registers 214 may be 64-bits wide, 128-bits wide, 256-bits wide, 512-bits wide, etc.

Figure 4A:
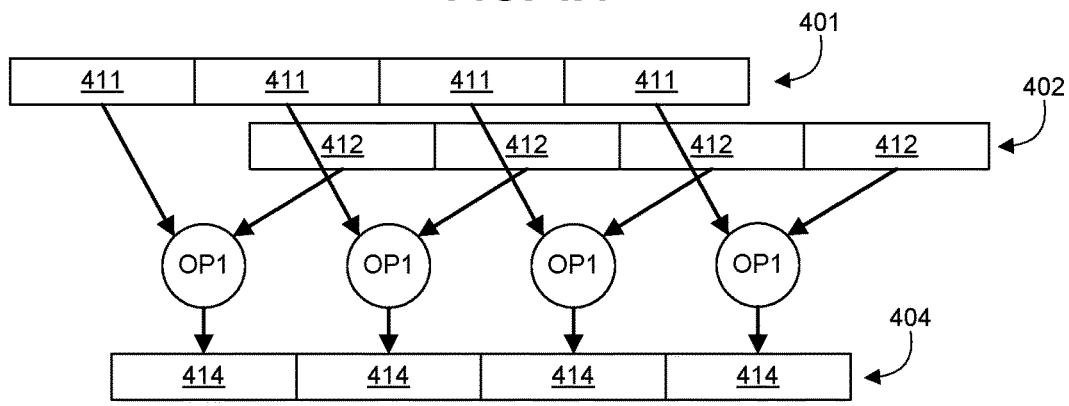
FIG. 4A illustrates a vector processing operation.

FIG. 4A illustrates a vector processing operation. Processor 204, for example, may receive two vectors 401-402 as input; each one with a set of one or more operands. Vector 401 includes a set of operands 411, and vector 402 includes a set of operands 412. Processor 204 is able to perform the same operation (OP1) on both sets of operands 411 and 412 (one operand from each vector) at a time and output a vector 404 with the results 414. Processor 204 may have a variety of architectures that allow for vector processing 210, such as a Central Processing Unit (CPU) or a Graphics Processing Unit (GPU) that use either a Single Instruction Multiple Data (SIMD) paradigm or a Single Program Multiple Data (SPMD) paradigm. In a SIMD paradigm, a single instruction is executed in parallel on multiple data points, and in an SPMD paradigm, a single procedure, or sequence of instructions, is executed on multiple data points.

Figure 4B:
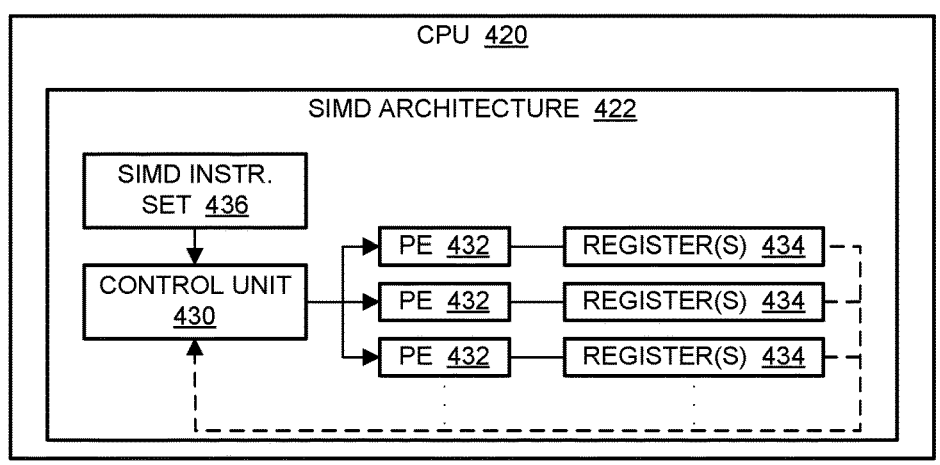
FIGS. 4B-4C illustrate a CPU and a GPU.
Figure 4C:
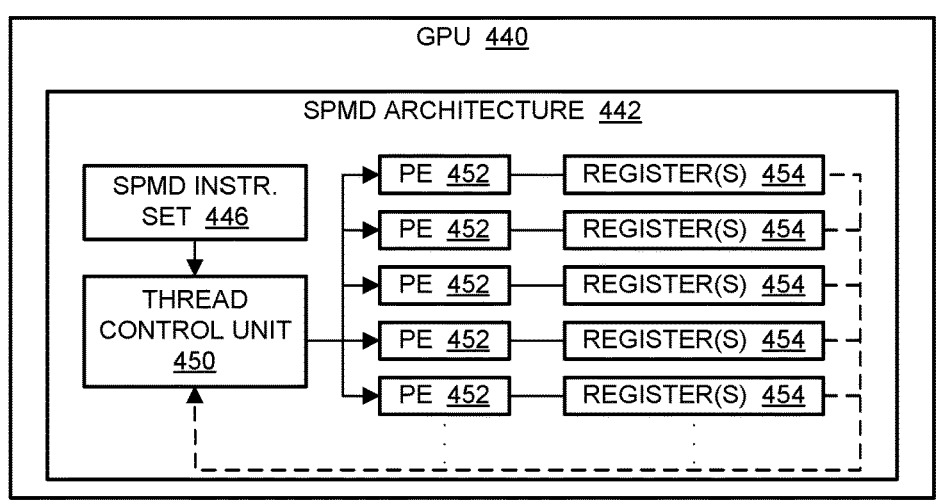

FIGS. 4B-4C illustrate a CPU 420 and a GPU 440, respectively, that perform SIMD or SPMD operations. In FIG. 4B, CPU 420 includes a SIMD architecture 422, which includes a control unit 430, and one or more processing clusters that include multiple processing elements (PE) 432 (e.g., Arithmetic Logic Units (ALUs)) and corresponding registers 434 (also referred to as memory modules (MM)). Although three processing elements 432 are illustrated in this example, more or less processing elements may be used in other examples. Control unit 430 is configured to fetch or retrieve a SIMD instruction set 436, and issue instructions to the PEs 432 from the instruction set 436 during one or more clock cycles. Control unit 430 is also configured to manage data fetching and data storage. PEs 432 represent the computational resources that perform operations based on instructions from control unit 430. Registers 434 are configured to temporarily store data for operations performed by PEs 432. For example, registers 434 may be 64-bits wide, 128-bits wide, 256-bits wide, 512-bits wide, etc. Control unit 430 may also manage processes for loading data into registers 434. In FIG. 4C, GPU 440 includes a SPMD architecture 442, which includes a thread control unit 450 that operates based on an SPMD instruction set 446, and one or more processing clusters that include multiple PEs 452 and corresponding registers 454. It is noted that FIGS. 4B-4C illustrate a basic structure of a CPU 420 and a GPU 440 for SIMD or SPMD operations, and other structures are considered herein.

Figure 5A:
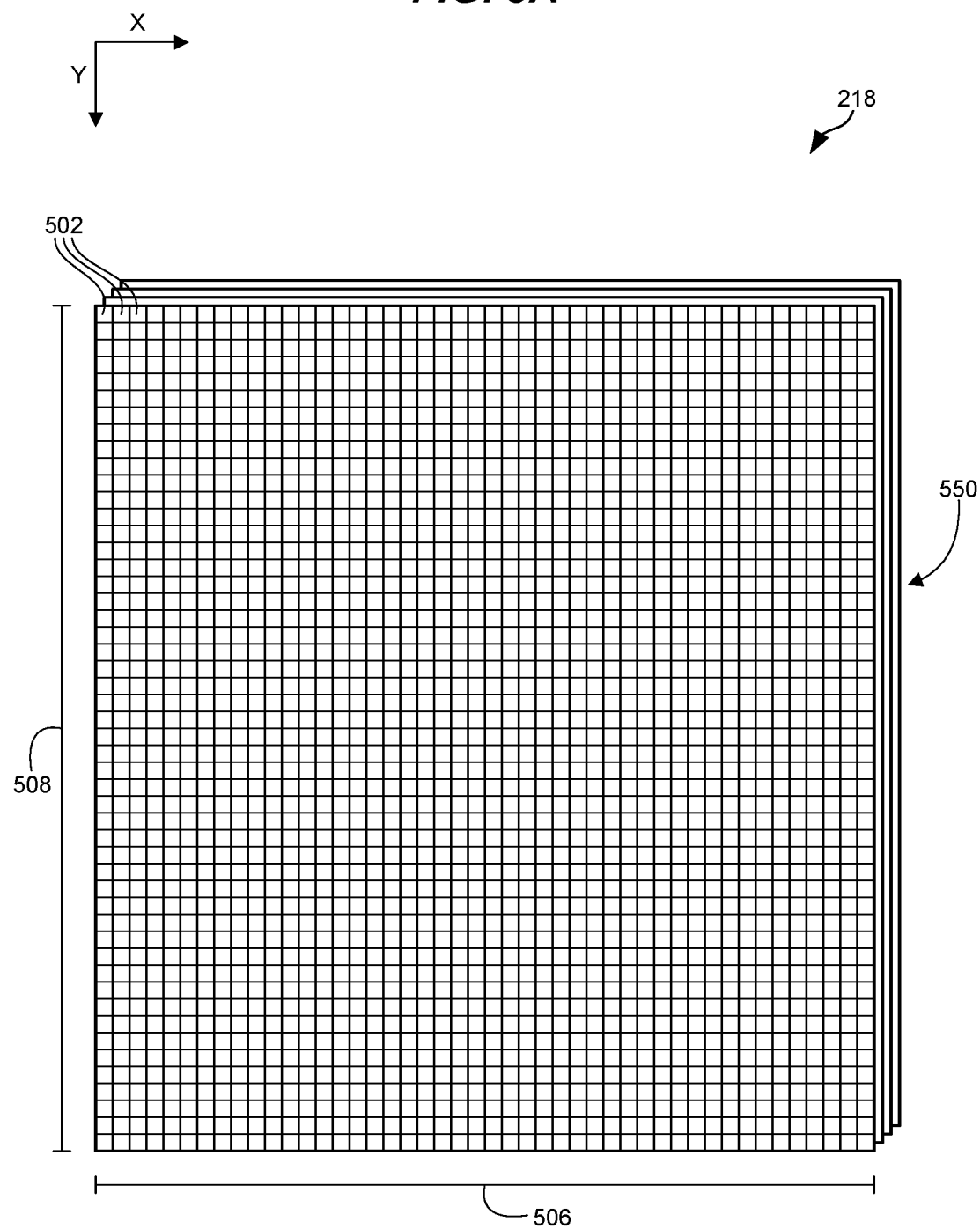
FIG. 5A illustrates a source image in an illustrative embodiment.

FIG. 5A illustrates a source image 218 in an illustrative embodiment. Source image 218 is a data structure that represents an array of pixels 502 with multi-bit pixel values. Source image 218 has a width 506 in the x-direction (or horizontal direction/width direction) defined by a number of columns of pixels 502, and a height 508 in the y-direction (or vertical direction/transport direction of recording medium 132) defined by a number of rows of pixels 502. The y-direction may correspond with the printing direction of the source image 218, which may comprise the direction of movement of recording medium 132 during a printing operation. Source image 218 is for a single color plane 550, such as C, M, Y, or K. FIG. 5B illustrates the array 520 of pixels 502 defining source image 218 in an illustrative embodiment. The pixels 502 are arranged in rows 510 and columns 511. There are "m+1" number of rows 510, and "n+1" number of columns 511. For illustrative purposes, each pixel 502 is noted with position information comprising a (row, column) identifier (e.g., "0,0"). Each pixel 502 has an associated pixel value 504 (PV) that is defined by x-bits, such as 8-bits, 16-bits, etc. For example, if the pixel values 504 are 8-bit, then each pixel 502 may have any value between 0-255 (decimal).

Figure 6A:
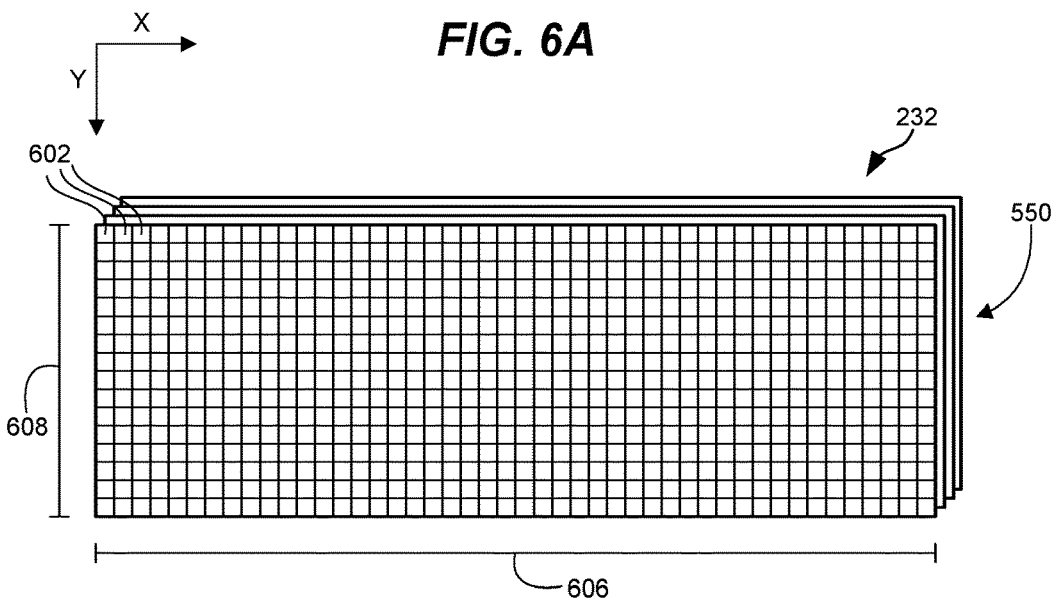
FIG. 6A illustrates a threshold array in an illustrative embodiment.
Figure 6B:
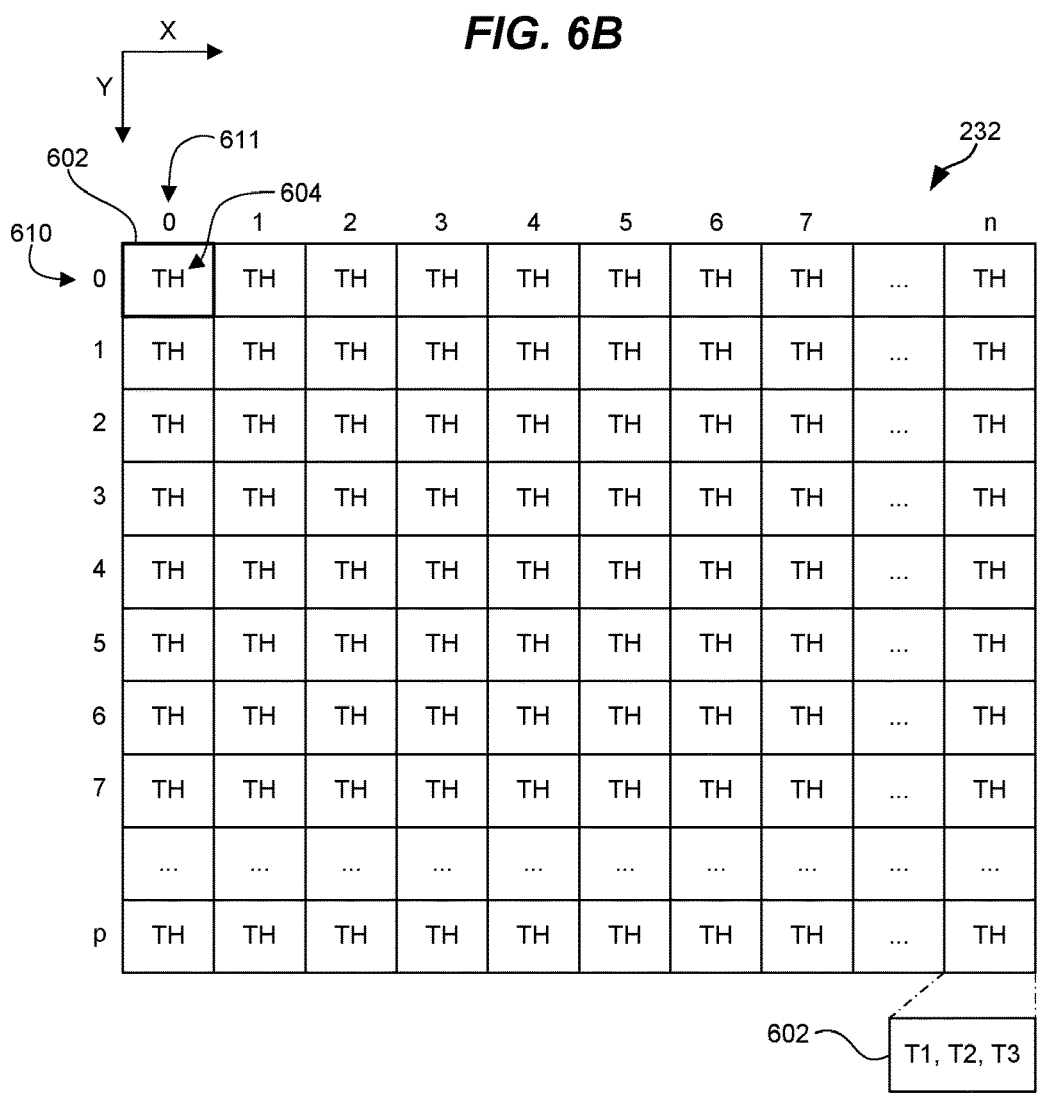
FIG. 6B further illustrates a threshold array in an illustrative embodiment.

FIG. 6A illustrates a threshold array 232 in an illustrative embodiment. Threshold array 232 is a data structure that represents an array or matrix of threshold elements 602 comprising threshold values. Threshold array 232 has a width 606 in the x-direction defined by a number of columns of threshold elements 602, and a height 608 in the y-direction defined by a number of rows of threshold elements 602. Threshold comparator 230 may set the width 606 and/or height 608 of the threshold array 232 (e.g., by tiling a smaller base threshold array to comprise the threshold array 232 with the target dimensions). In an embodiment, the width 606 of threshold array 232 is equal to, or at least as wide as, the width 506 of the source image 218, and the height 608 of threshold array 232 is less than the height 508 of source image 218. Threshold array 232 is for a single color plane 550, such as C, M, Y, or K. FIG. 6B further illustrates threshold array 232 in an illustrative embodiment. The threshold elements 602 are arranged in rows 610 and columns 611. There are "p+1" number of rows 610, and "n+1" number of columns 611. Each threshold element 602 indicates or contains one or more threshold values 604 (TH). As indicated in the magnified threshold element 602, threshold elements 602 may comprise a plurality of threshold values 604 (e.g., T1, T2, T3) defined to distinguish different intensity levels or dot sizes. For example, to generate a two-bit halftoned image 222, three threshold values may be defined per threshold element 602. The first threshold values (T1) are used to distinguish a first intensity level and a second intensity level, the second threshold values (T2) are used to distinguish the second intensity level and a third intensity level, and the third threshold values (T3) are used to distinguish the third intensity level and a fourth intensity level. However, different numbers of intensity levels are considered herein.

Figure 7:
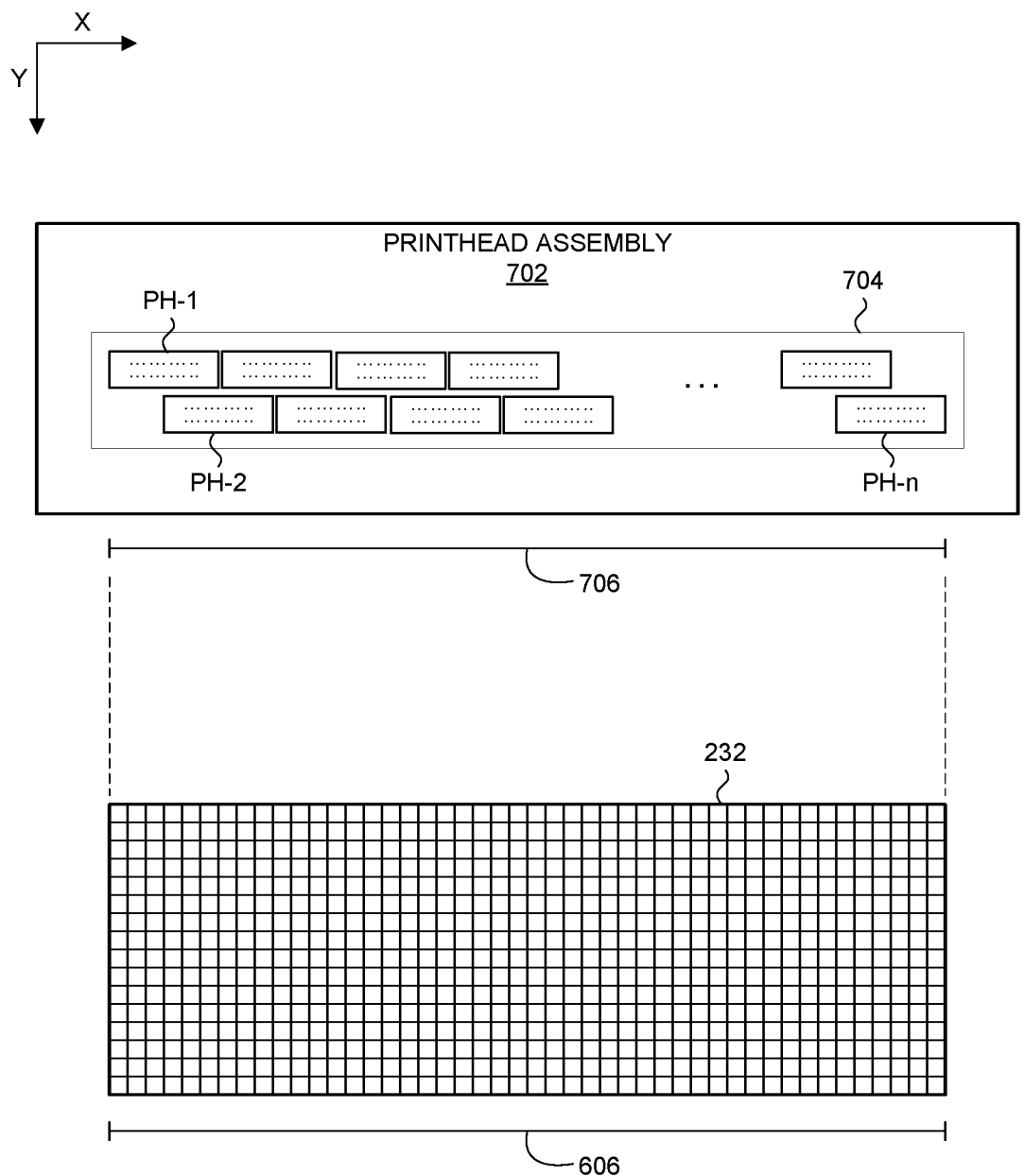
FIG. 7 illustrates a printhead assembly of a print mechanism in an illustrative embodiment.

In an embodiment, the width 606 of threshold array 232 is as wide as a printable width of print mechanism 126. In another embodiment, the width 606 of threshold array 232 is greater than or equal to the printable width of print mechanism 126. In that case, threshold array positions not associated with the printable width may bypass halftone processing with the resulting technical benefit of removing the computational burden of changing the threshold array width to match a changed printable width. FIG. 7 illustrates a printhead assembly 702 of print mechanism 126 in an illustrative embodiment. Printhead assembly 702 includes a plurality of printheads 704 (e.g., PH-1, PH-2, . . . , PH-n) arranged in an array that define a print width or printable width 706 of printhead assembly 702. For example, the printable width 706 may be 20.5 inches, 22.5 inches, or some other width. The width 606 of threshold array 232 is as wide as (e.g., equal to or greater than) the printable width 706 of printhead assembly 702.

Figure 8:
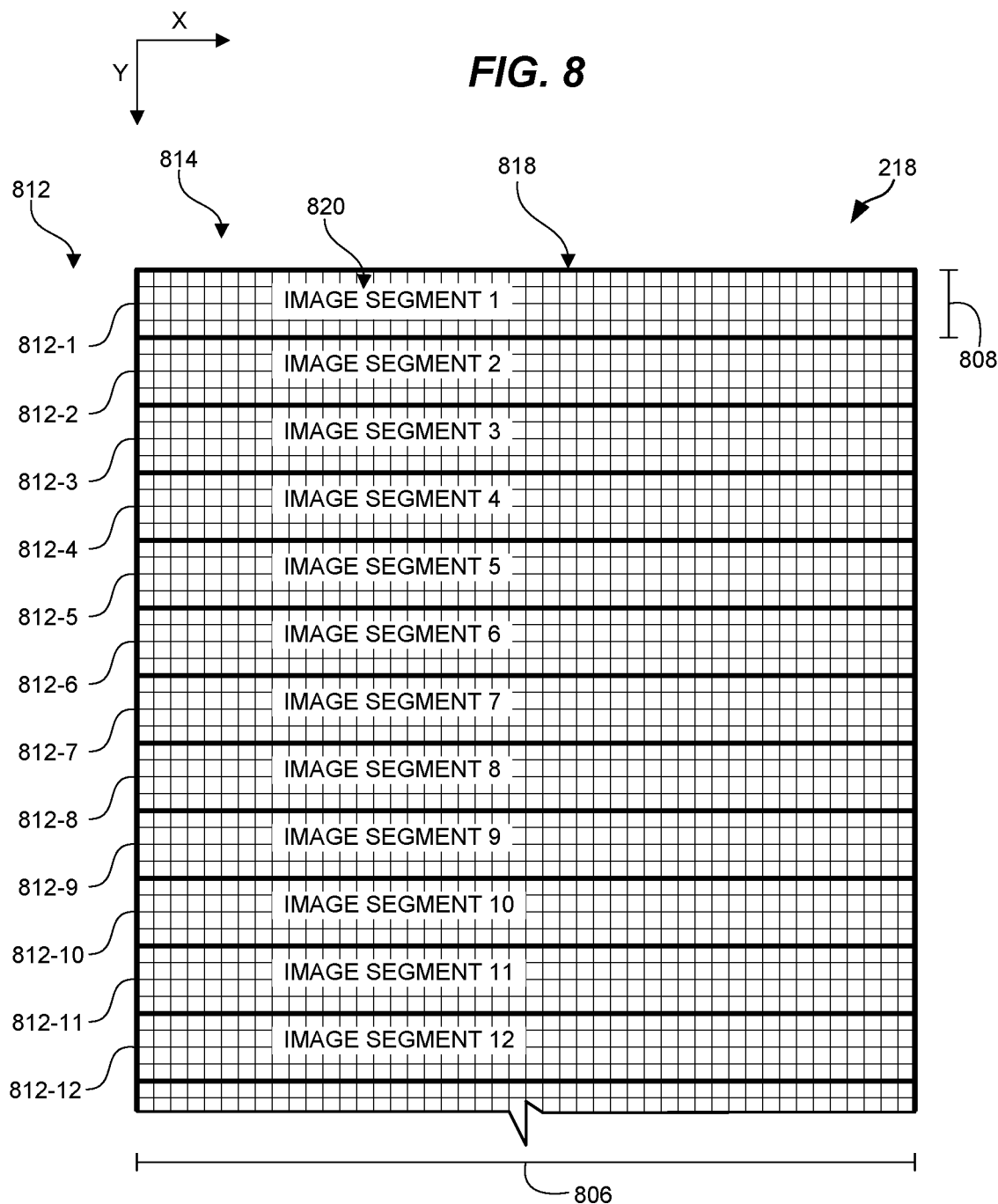
FIG. 8 illustrates a source image partitioned into a sequence of image segments in an illustrative embodiment.

In FIG. 2, threshold comparator 230 is configured to partition or divide the source image 218 into a sequence of image segments. FIG. 8 illustrates the source image 218 partitioned into a sequence 814 of image segments 812 in an illustrative embodiment. Threshold comparator 230 partitions or divides the source image 218 in the y-direction into image segments 812. An image segment 812 comprises a set of rows of pixels 502 from source image 218, and may also be referred to as an image stripe, a horizontal image stripe, an image band, an image slice, an image strip, a division region, etc. In other words, an image segment 812 comprises a widthwise or horizontal swathe of pixels 502 in the x-direction from source image 218. In an embodiment, the width 806 of an image segment 812 matches or is as wide as the width 506 of the source image 218. Thus, source image 218 may be undivided in the x-direction so that an image segment 812 spans the (entire) width 506 of the source image 218. The height 808 of an image segment 812 is defined by the number (plural) of rows of pixels 502 in the image segment 812. Image segments 812 are illustrated in FIG. 8 as comprising four rows of pixels 502 as an example, but image segments 812 may comprise 32-rows, 64-rows, etc. In an embodiment, the image segments 812 are contiguous or adjoining in the sequence 814 as shown in FIG. 8. Thus, a pixel row in one image segment 812 is directly adjacent to a pixel row in a neighboring or adjacent image segment 812 within the sequence 814. In an embodiment, each image segment 812 is discrete, and does not overlap a neighboring or adjacent image segment 812. In an embodiment, threshold comparator 230 partitions or divides the source image 218 such that the image segments 812 are (substantially) equal, such as in size 818 in the x-direction and y-direction.

Figure 9:
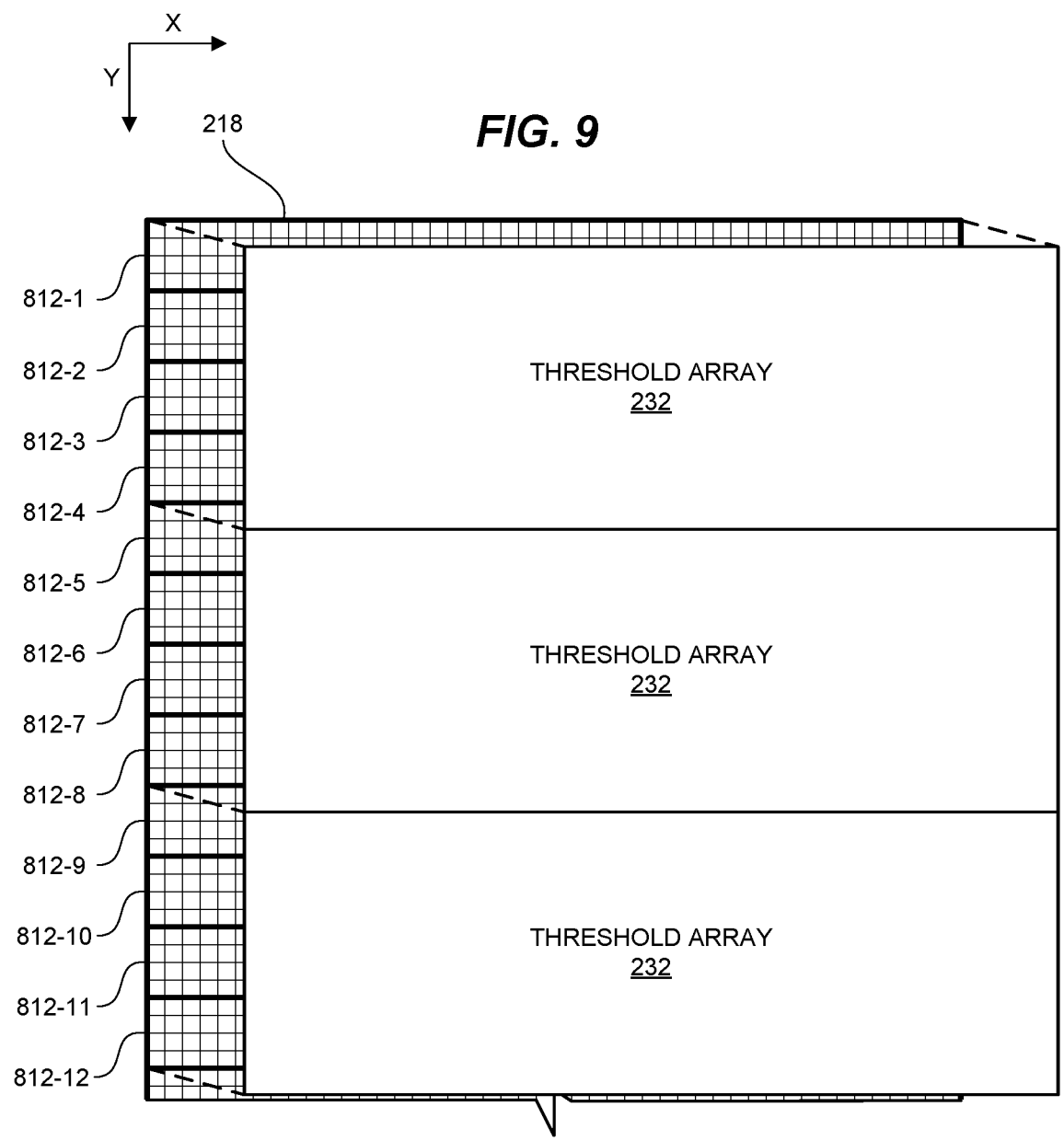
FIGS. 9-10 illustrate multiple instances of a threshold array overlaid on a source image in an illustrative embodiment.

FIG. 9 illustrates multiple instances of a threshold array 232 overlaid on source image 218 in an illustrative embodiment. The threshold array 232 is replicated over the source image 218 so that each pixel 502 in the source image 218 is mapped to a particular location in the threshold array 232. The height 608 of threshold array 232 (see FIG. 6A) is less than the height 508 of the source image 218 (see FIG. 5A), so threshold array 232 is overlaid multiple times over source image 218. At the same time, the height 608 of threshold array 232 is greater than the height 808 of image segments 812 (see FIG. 8) such that an instance of the threshold array 232 overlaps multiple image segments 812. Consecutive image segments 812 in sequence 814 are therefore overlaid with different portions a single instance of the threshold array 232.

Figure 10:
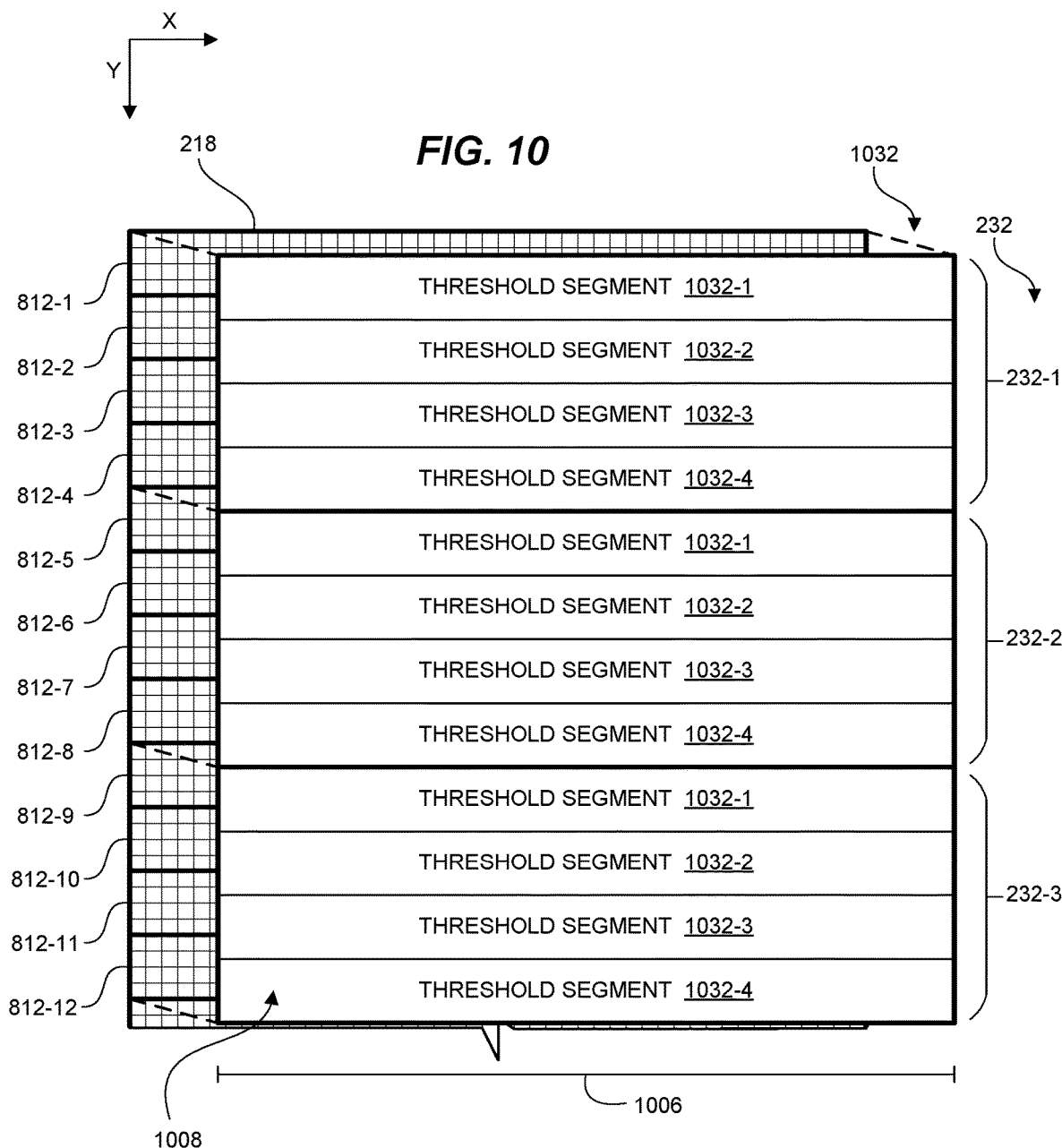

FIG. 10 illustrates multiple instances of threshold array 232 overlaid on source image 218 in an illustrative embodiment. At a first instance 232-1 of threshold array 232, a first image segment 812-1 is overlaid with a portion or segment of threshold array 232 (referred to as threshold segment 1032-1), a second image segment 812-2 is overlaid with another portion or segment of threshold array 232 (referred to as threshold segment 1032-2), a third image segment 812-3 is overlaid with another portion or segment of threshold array 232 (referred to as threshold segment 1032-3), and a fourth image segment 812-4 is overlaid with another portion or segment of threshold array 232 (referred to as threshold segment 1032-4). A threshold segment 1032 comprises a set of rows of threshold elements 602 from threshold array 232, and may also be referred to as a threshold stripe, a horizontal threshold stripe, a threshold band, a threshold slice, a threshold strip, etc. In other words, a threshold segment 1032 comprises a widthwise or horizontal swathe of threshold elements 602 in the x-direction from threshold array 232. In an embodiment, the width 1006 of a threshold segment 1032 matches or is as wide as the width 806 of an image segment 812. In an embodiment, the height 608 of the threshold array 232 may be a multiple of the height 808 of an image segment 812 so that a whole number of image segment 812 are overlaid by a single instance of the threshold array 232 resulting in a technical benefit of maximizing processing efficiency. For example, the height 608 of threshold array 232 may be 512 rows of threshold elements 602, while the height 808 of an image segment 812 may be 64 rows of pixels 502.

At a second instance 232-2 of threshold array 232, a fifth image segment 812-5 is overlaid with threshold segment 1032-1, a sixth image segment 812-6 is overlaid with threshold segment 1032-2, a seventh image segment 812-7 is overlaid with threshold segment 1032-3, and an eighth image segment 812-8 is overlaid with threshold segment 1032-4. At a third instance 232-3 of threshold array 232, a ninth image segment 812-9 is overlaid with threshold segment 1032-1, a tenth image segment 812-10 is overlaid with threshold segment 1032-2, an eleventh image segment 812-11 is overlaid with threshold segment 1032-3, and a twelfth image segment 812-12 is overlaid with threshold segment 1032-4. Thus, threshold segment 1032-1 is overlaid on image segments 812-1, 812-5, and 812-9, threshold segment 1032-2 is overlaid on image segments 812-2, 812-6, and 812-10, threshold segment 1032-3 is overlaid on image segments 812-3, 812-7, and 812-11, and threshold segment 1032-4 is overlaid on image segments 812-4, 812-8, and 812-12. Threshold comparator 230 is able to identify a mapping such as this between image segments 812 of source image 218, and threshold segments 1032 of threshold array 232.

Based on this mapping, for example, threshold comparator 230 is configured to partition or divide the threshold array 232 into threshold segments 1032 that correspond with the image segments 812, such as shown in FIG. 10. During a halftone process, threshold comparator 230 fetches an individual threshold segment 1032 from memory 206, and processes the image segments 812 that are "overlaid" or mapped to that threshold segment 1032 as a group. In an embodiment, the size 1008 (in bytes) of a threshold segment 1032 is less than or equal to the capacity of cache memory for a processor 204 or core 332, such as the capacity of L1 cache 336 and/or L2 cache 338. One technical benefit is a threshold segment 1032 is fetched from main memory for processing instead of the entire threshold array 232, which maximizes processing efficiency and/or minimize cache misses.

Figure 11:
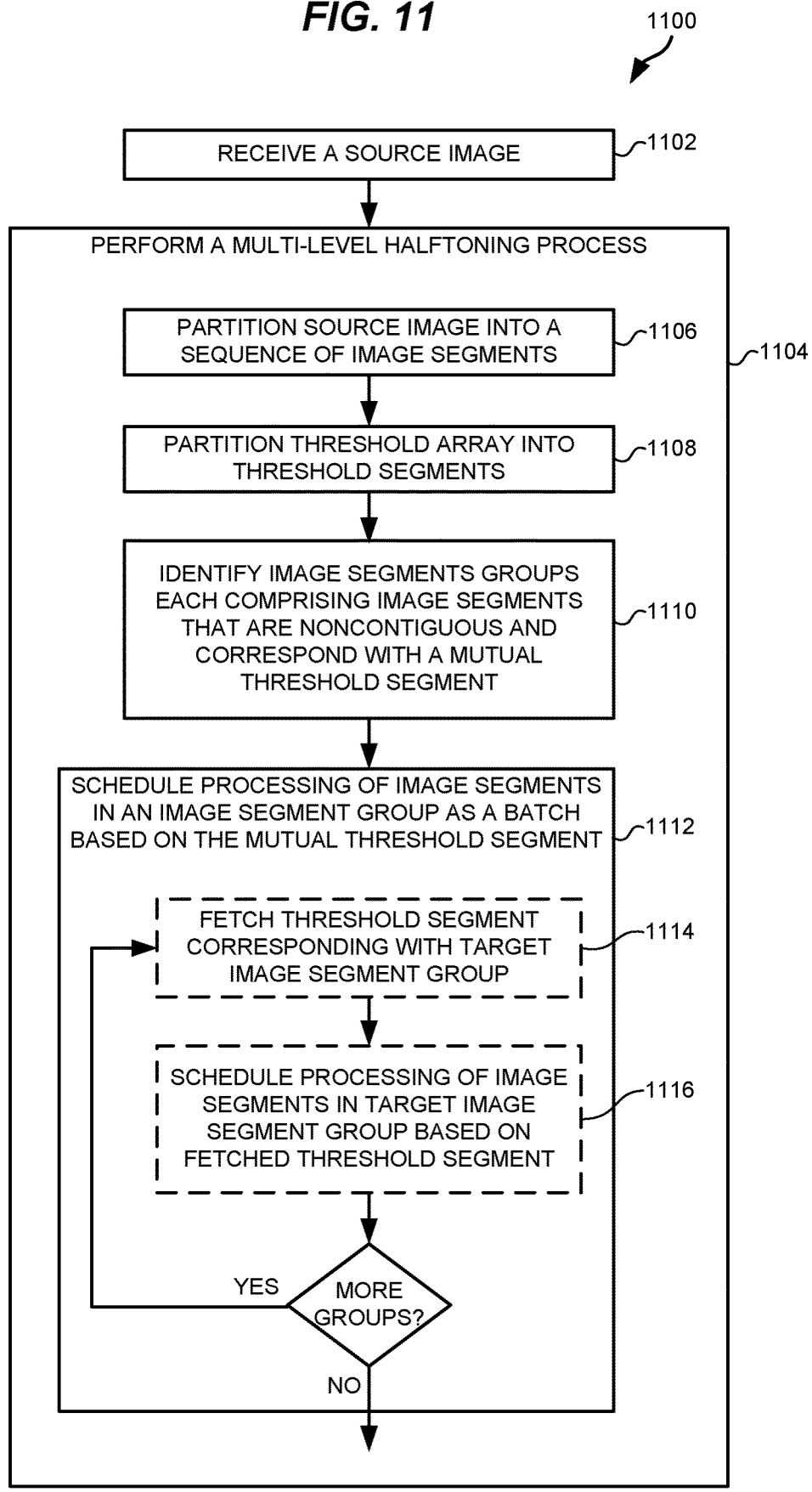
FIG. 11 depicts a flowchart illustrating a method of halftoning in an illustrative embodiment.

FIG. 11 depicts a flowchart illustrating a method 1100 of halftoning in an illustrative embodiment. The steps of method 1100 are described with reference to halftone system 140 in FIG. 2, but those skilled in the art will appreciate that method 1100 may be performed with other systems. The steps of the flowcharts described herein are not all inclusive and may include other steps not shown. The steps described herein may also be performed in an alternative order. Method 1100 may also be referred to as an image processing method.

Threshold comparator 230 receives a source image 218 comprising an array of pixels 502 (step 1102) for a color plane 550, and performs a multi-level halftoning or imaging process on the source image 218 (step 1104). As part of the halftoning process, threshold comparator 230 partitions or divides the source image 218 into a sequence 814 of image segments 812 (step 1106). Threshold comparator 230 also identifies a threshold array 232 for the color plane 550 of the source image 218, and partitions or divides the threshold array 232 into a plurality of threshold segments 1032 (step 1108). As described above, threshold comparator 230 identifies or determines a mapping between the image segments 812 and the threshold segments 1032, such as in FIG. 10. Thus, threshold comparator 230 is able to determine which image segments 812 correspond with which threshold segments 1032 of the threshold array 232.

Threshold comparator 230 then separates processing of the image segments 812 based on the relationship or mapping between the image segments 812 and the threshold segments 1032. For example, threshold comparator 230 identifies image segment groups each comprising a set of the image segments 812 that are noncontiguous in the sequence 814 and correspond with the same or a mutual threshold segment 1032 of the threshold array 232 (step 1110). Threshold comparator 230 schedules processing (e.g., processing tasks or operations) of the image segments 812 in an image segment group as a batch (e.g., a number of image segments 812 considered as a unit) based on the mutual threshold segment 1032 (step 1112). In other words, the threshold segments 1032 comprise criteria that determine an order in which image segments 812 are scheduled for processing within threshold comparator 230 (i.e., comparing pixel values 504 from the image segment 812 with threshold values 604 from a threshold segment 1032 to generate comparison bits). Threshold comparator 230 schedules the image segments 812 for processing in image segment groups based on the threshold segment 1032 related to that image segment group instead of in the order of sequence 814. Thus, an individual image segment group comprises a processing target where image segments 812 of the image segment group are scheduled for processing in an order (i.e., consecutively or sequentially) by threshold comparator 230. After each image segment 812 of an image segment group is scheduled for processing (or is already processed), threshold comparator 230 may begin scheduling image segments 812 from another image segment group (related to a different threshold segment 1032). Each of the image segment groups therefore comprises a separate processing target for threshold comparator 230. One technical benefit is a threshold segment 1032 is fetched from memory 206 in processing an image segment group, instead of fetching the entire threshold array 232.

Figure 12:
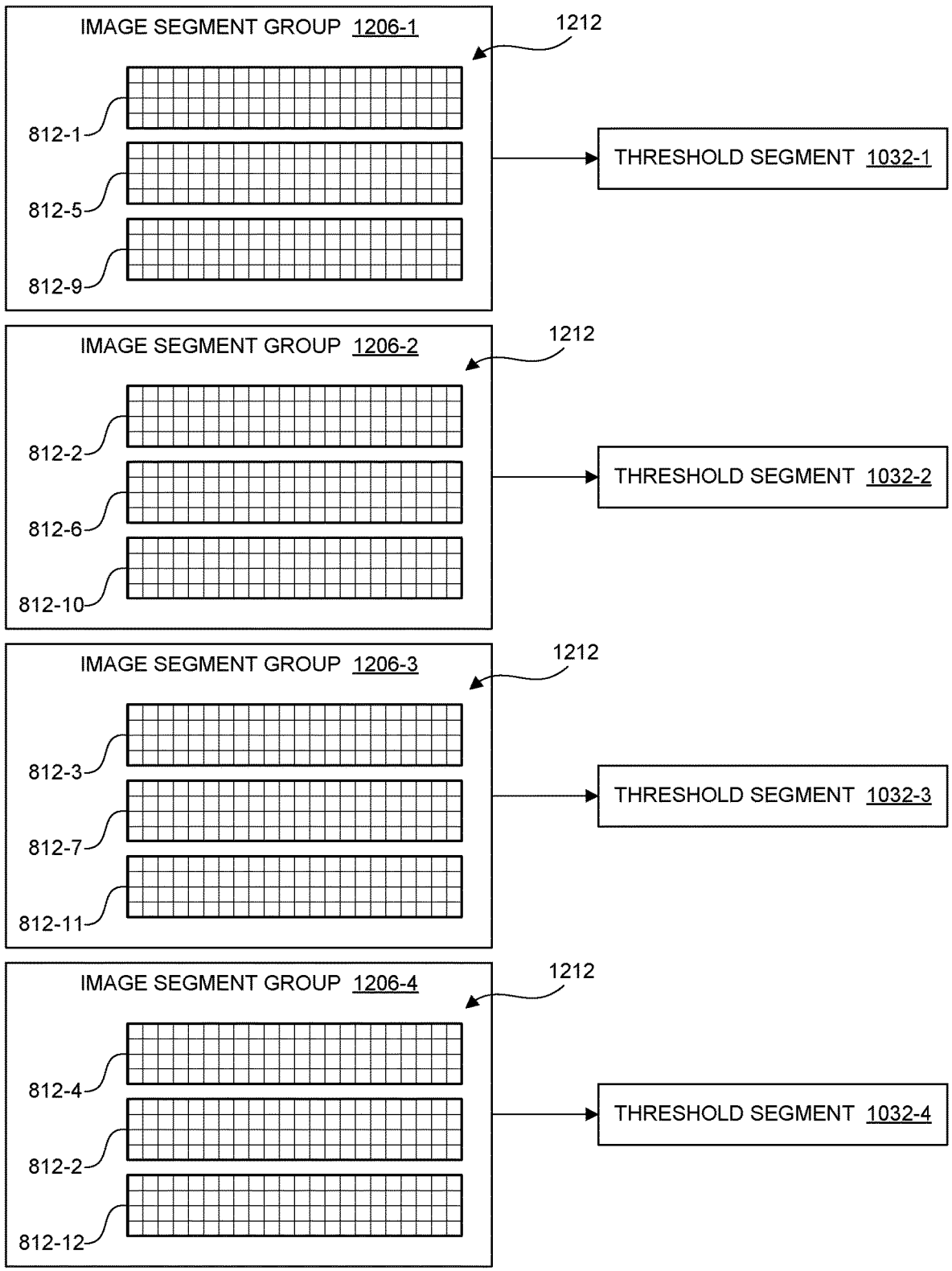
FIG. 12 illustrates image segment groups in an illustrative embodiment.

FIG. 12 illustrates image segment groups 1206 in an illustrative embodiment. Image segment group 1206-1 comprises a set 1212 of image segments 812 (i.e., image segments 812-1, 812-5, and 812-9) that are noncontiguous in sequence 814 and are each mapped to threshold segment 1032-1. Image segment group 1206-2 comprises a set 1212 of image segments 812 (i.e., image segments 812-2, 812-6, and 812-10) that are noncontiguous in sequence 814 and are each mapped to threshold segment 1032-2. Image segment group 1206-3 comprises a set 1212 of image segments 812 (i.e., image segments 812-3, 812-7, and 812-11) that are noncontiguous in sequence 814 and are each mapped to threshold segment 1032-3. Image segment group 1206-4 comprises a set 1212 of image segments 812 (i.e., image segments 812-4, 812-8, and 812-12) that are noncontiguous in sequence 814 and are each mapped to threshold segment 1032-4. Thus, each image segment group 1206 is mapped to or corresponds with a different threshold segment 1032 of threshold array 232.

Threshold comparator 230 schedules processing of the image segments 812 of an image segment group 1206 based on the threshold segment 1032 associated with that image segment group 1206 (see step 1112 of FIG. 11). In an embodiment, threshold comparator 230 may fetch or load the threshold segment 1032 from memory 206 that corresponds with a target image segment group 1206 (optional step 1114), such as in a local cache (e.g., L1 cache 336). For example, threshold comparator 230 may fetch threshold segment 1032-1 from memory 206 corresponding with image segment group 1206-1 as shown in FIG. 12 (exclusive of the remainder of threshold array 232). Threshold comparator 230 then schedules processing of the image segments 812 in the target image segment group 1206 in order (i.e., consecutively or sequentially) based on the threshold segment 1032 associated with the target image segment group 1206 (optional step 1116), with the threshold segment 1032 corresponding with the target image segment group 1206 is loaded in the cache. For example, threshold comparator 230 may schedule processing of image segments 812-1, 812-5, and 812-9 in image segment group 1206-1 consecutively while threshold segment 1032-1 is loaded in local cache. Therefore, one or more image segments 812-1, 812-5, and 812-9 in image segment group 1206-1 may be processed concurrently or in parallel depending on the capabilities of processor 204. One technical benefit is threshold comparator 230 is able to schedule processing of image segments 812 in an order based on the threshold segment 1032 that is loaded in local cache to minimize cache misses associated with fetching different portions of threshold array 232.

Threshold comparator 230 then repeats this process for other image segment groups 1206. For example, after each image segment 812 of the target image segment group 1206 has been scheduled for processing or has been processed, threshold comparator 230 may transition to the next target image segment group 1206 associated with a different threshold segment 1032. Thus, threshold comparator 230 fetches the other threshold segment 1032 from memory 206 corresponding with the next target image segment group 1206-2 into a local cache (e.g., L1 cache 336). For example, threshold comparator 230 may fetch threshold segment 1032-2 from memory 206 corresponding with image segment group 1206-2 as shown in FIG. 12, and schedule processing of image segments 812-2, 812-6, and 812-10 in image segment group 1206-2 in order while threshold segment 1032-2 is loaded in local cache. Threshold comparator 230 may repeat this process for each of the image segment groups 1206.

Method 1100 may be repeated for source images 218 of other color planes 550.

According to method 1100, the image segments 812 of the source image 218 are processed "out-of-order" in relation to the sequence 814. Conventionally, image segments 812 of the source image 218 may be processed "in-order" of the sequence 814. But as described above, the image segments 812 in the order of the sequence 814 correspond with different threshold segments 1032 of the threshold array 232, which can lead to cache misses associated with fetching a threshold array. One technical benefit of processing the image segments 812 "out-of-order" is that the relevant threshold segment 1032 can be fetched from memory 206, and each image segment 812 mapped to the threshold segment 1032 are scheduled for processing as a group to minimize cache misses.

Figure 13:
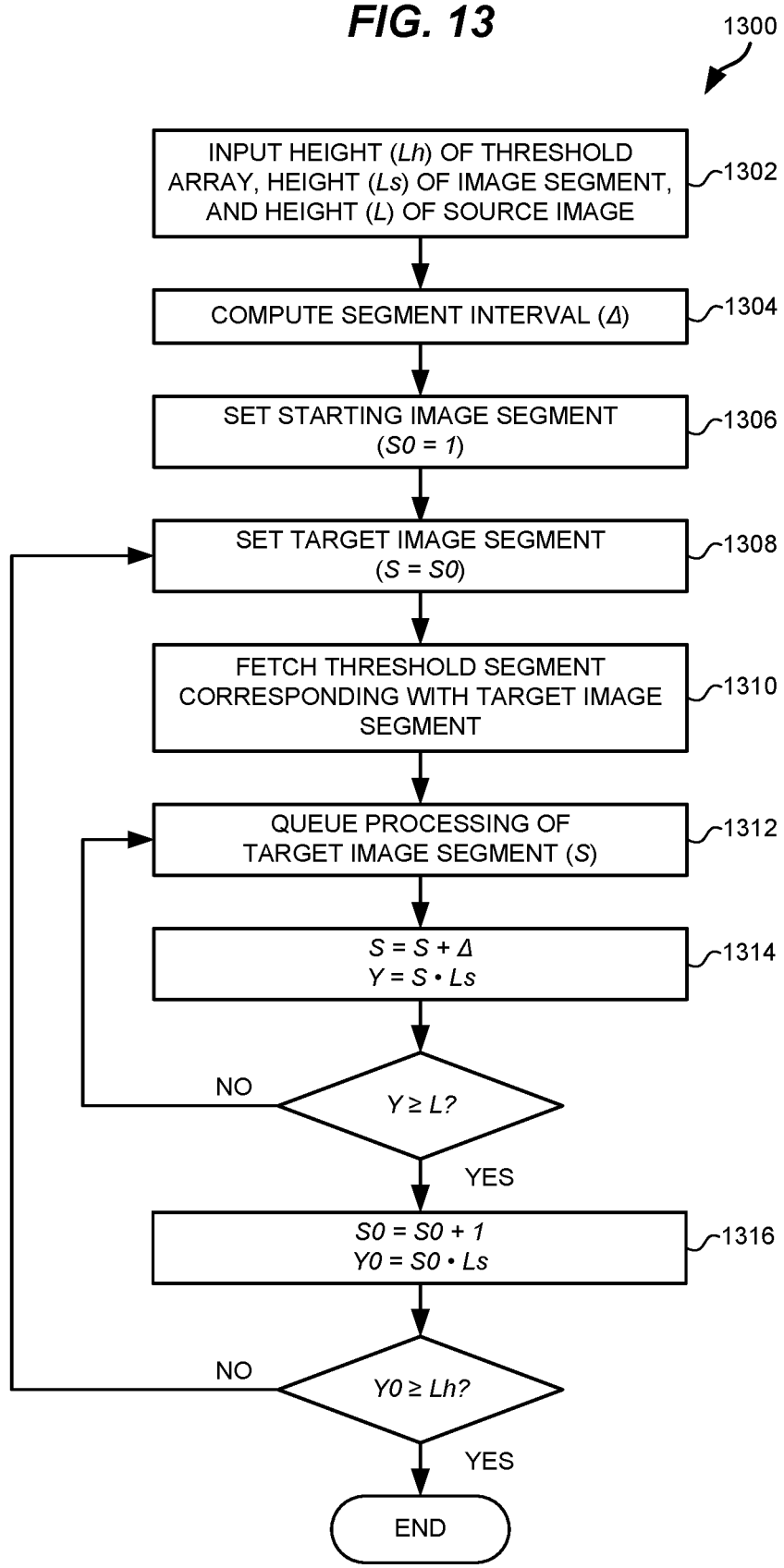
FIG. 13 depicts a flowchart illustrating a method of processing image segments in an illustrative embodiment.

FIG. 13 depicts a flowchart illustrating a method 1300 of processing image segments 812 in an illustrative embodiment. Method 1300 illustrates one way of processing image segments 812 "out-of-order" of sequence 814. Threshold comparator 230 inputs or determines a height 608 ($L_h$) of the threshold array 232, a height 808 ($L_s$) of an image segment 812, and a height 508 (L) of the source image 218 (step 1302). Threshold comparator 230 computes or determines a segment interval ($\Delta$), which indicates an interval between noncontiguous image segments 812 that correspond with a mutual threshold segment 1032 (step 1304). For example, threshold comparator 230 may compute the segment interval ($\Delta$) as $L_h/L_s$. Threshold comparator 230 then sets or determines a starting image segment 812 ($S_0$) of the source image 218 when initiating the processing, which may comprise the first image segment 812-1 (step 1306). It is noted that threshold comparator 230 may assign segments identifiers 820 to the image segments 812 in numerical order (e.g., 1, 2, 3, . . . ). Threshold comparator 230 sets or determines a target image segment 812 (S) for processing (step 1308). Initially, the target image segment 812 (S) comprises the first image segment 812-1. Threshold comparator 230 fetches the threshold segment 1032 corresponding with the target image segment 812 (step 1310). For example, threshold comparator 230 may fetch the threshold segment 1032 from memory 206 and store the threshold segment 1032 in a local cache.

With the threshold segment 1032 stored in a local cache, threshold comparator 230 schedules processing of image segments 812 in an image segment group 1206 consecutively based on the threshold segment 1032. As shown in FIG. 2, threshold comparator 230 includes a scheduler 234 and a task queue 236. Scheduler 234 is configured to schedule processing tasks or operations on the task queue 236 for processing, such as by one or more cores 332. Scheduler 234 queues processing of the target image segment 812 (step 1312). More particularly, scheduler 234 queues processing of the target image segment 812 as a processing task in task queue 236.

Threshold comparator 230 determines a next target image segment 812 (S) for the image segment group 1206 associated with the threshold segment 1032 stored in local cache, based on the segment interval (S=S+$\Delta$) (step 1314), if there is a next target image segment 812 (S). For example, threshold comparator 230 calculates Y=S·$L_s$, and determines whether Y≥L. If so, the end of the source image 218 has been reached and processing of image segments 812 corresponding with the fetched threshold segment 1032 is completed. If Y is not greater than or equal to L, scheduler 234 queues processing of the next target image segment 812 (step 1312). Thus, scheduler 234 iteratively queues processing of the image segments 812 in an image segment group 1206 corresponding with the fetched threshold segment 1032 so that the processing tasks in task queue 236 are sequential or consecutive.

If Y is greater than or equal to L, the end of the source image 218 has been reached and processing of image segments 812 corresponding with the fetched threshold segment 1032 is completed. Threshold comparator 230 sets or determines a next target image segment 812 (S) for processing (step 1316), if there is a next target image segment 812. For example, threshold comparator 230 computes the next target image segment 812 ($S_0$) as $S_0=S_0+1$, and calculates $Y_0=S_0 \cdot L_s$. If $Y_0$ is not greater than or equal to $L_h$, then there is a next target image segment 812 (e.g., image segment 812-2), and threshold comparator 230 returns to step 1308 with the next target image segment 812. If $Y_0$ is greater than or equal to $L_h$, then the end of the source image 218 has been reached and processing of image segments 812 is completed.

Figure 14:
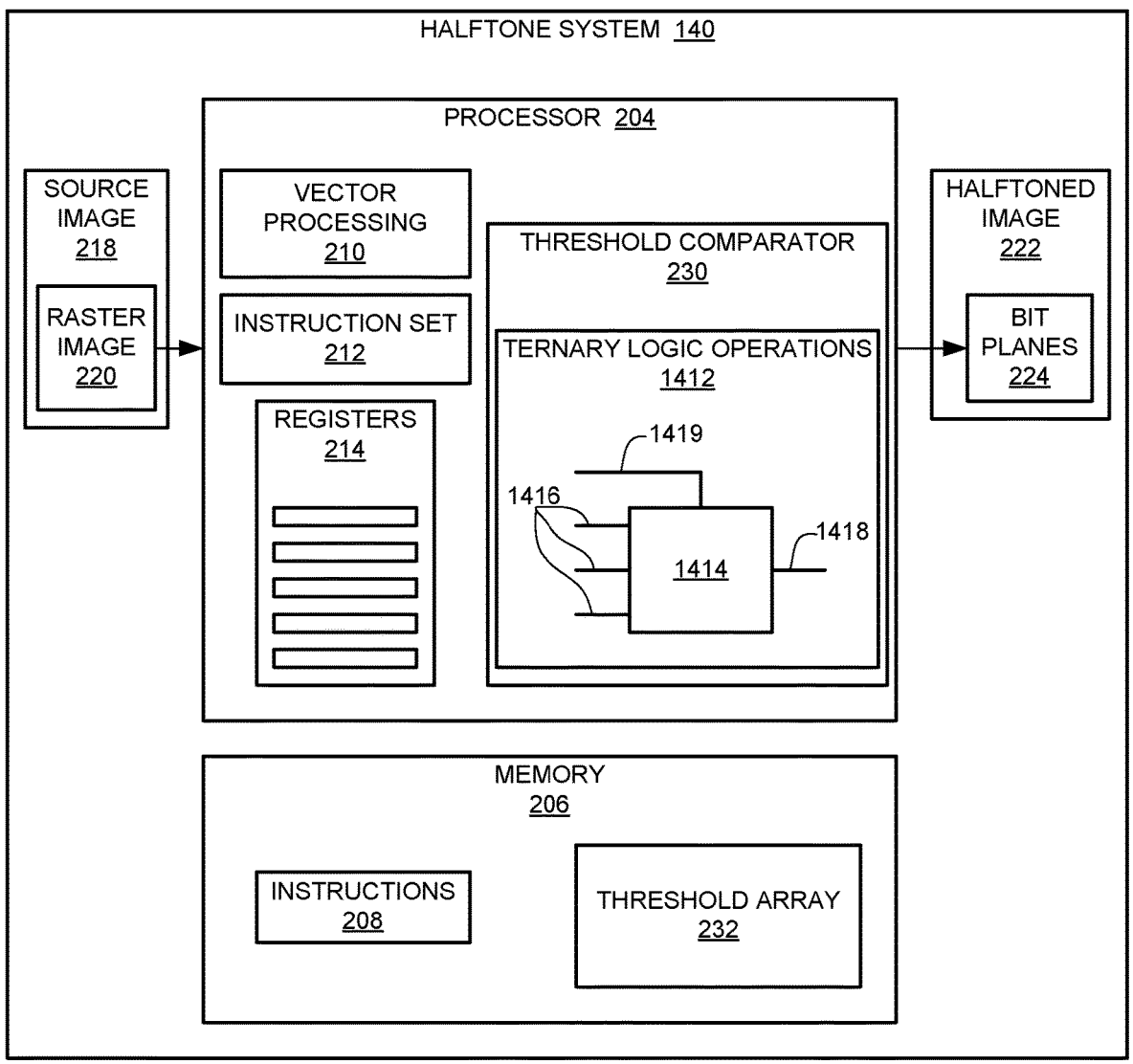
FIG. 14 is a schematic diagram of a halftone system in an illustrative embodiment.

FIG. 14 is a schematic diagram of halftone system 140 in an illustrative embodiment. In an embodiment, processor 204 may be further configured for ternary logic operations 1412. Ternary logic is a function which maps three input Boolean values (or "bits") to a single output bit. Processor 204 may include a ternary logic subsystem 1414 that includes three inputs 1416 and one output 1418. Ternary logic subsystem 1414 may be configured to perform a plurality of ternary logic functions. For example, there may be 256 ($2^8$) possible ternary logic functions defined. To select between the ternary logic functions, ternary logic subsystem 1414 further includes a selector parameter 1419 (e.g., an 8-bit code) that is used to select a desired ternary logic function for a given set of inputs 1416. CPU 420 and/or GPU 440 as discussed above may provide machine level instructions to implement ternary logic in this manner.

Figure 15A:
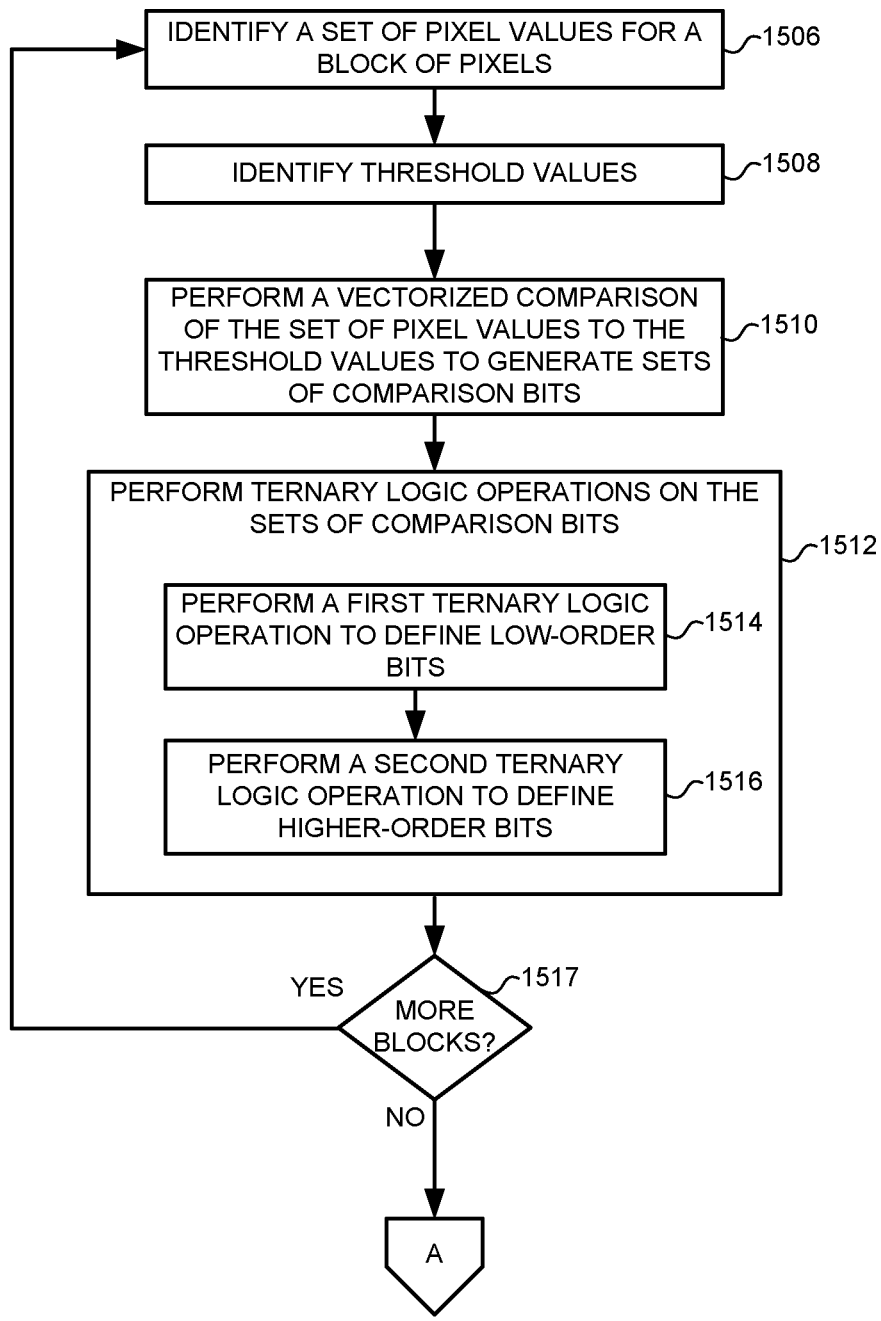

FIGS. 15A-15B depict a flowchart illustrating a method 1500 of processing an image segment 812 in an illustrative embodiment. The steps of method 1500 are described with reference to halftone system 140 in FIG. 14, but those skilled in the art will appreciate that method 1500 may be performed with other systems.

For method 1500, it is assumed that a threshold segment 1032 of the threshold array 232 is fetched from memory 206, and one or more image segments 812 from an image segment group 1206 are queued for processing. For the multi-level halftoning process, halftone system 140 may operate on one or more blocks of pixels 502 at a time. Thus, processor 204 may identify a set of pixel values 504 for pixels 502 in a block (step 1506). A block of pixels 502 comprises a grouping or number of pixels that are processed at a time. A block may be a number of pixels consecutive in a row 510 of source image 218, a number of pixels that wrap around from one row 510 to another, or another desired grouping of pixels. FIG. 16 illustrates a block 1600 of pixels 502 in an image segment 812 in an illustrative embodiment. In this example, block 1600 includes eight pixels 502 in a single row. But as explained above, block 1600 may have other numbers or groupings of pixels 502 in other examples. Processor 204 may load the set of pixel values 504 for block 1600 in a register, a local memory, or other memory location.

Processor 204 identifies a block of threshold values 604 from the threshold segment 1032 that correspond with the set of pixel values 504 for block 1600 (step 1508). FIG. 17 illustrates a block 1700 of threshold values 604 from a threshold segment 1032 in an illustrative embodiment. In this example, block 1700 includes eight threshold elements 602 in a single row that correspond with the eight pixels 502 in block 1600. But as explained above, block 1700 may have other numbers or groupings of threshold values 604 in other examples. Processor 204 may load the set of threshold values 604 for block 1700 in a register, a local memory, or other memory location. Multi-level reproduction involves multiple intensity levels, and therefore multiple thresholds that distinguish the different intensity levels. There is one less threshold than number of intensity levels. For example, a pixel 502 represented by two bits may have four intensity levels (e.g., "00", "01", "10", "11"). In this two-bit example with four intensity levels, there are three thresholds or threshold values that distinguish or divide the four intensity levels. Thus, processor 204 may identify first threshold values, second threshold values, and third threshold values from a threshold element 602. In a two-bit example with three intensity levels, there are two thresholds that distinguish or divide the three intensity levels. In a three-bit example with eight intensity levels, there may be seven thresholds that distinguish the eight intensity levels. Processor 204 identifies the threshold values in "sets" to accommodate vector processing as described below.

Figure 18:
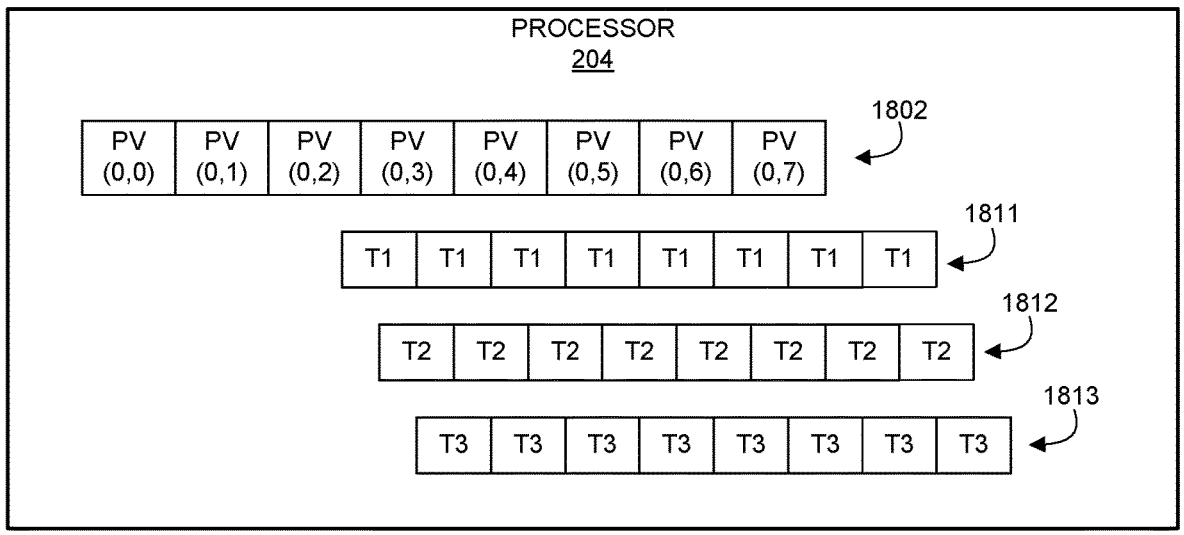
FIG. 18 is a schematic diagram of a processor with a set of pixel values (PV) for a block loaded in a local memory in an illustrative embodiment.
Figure 19:
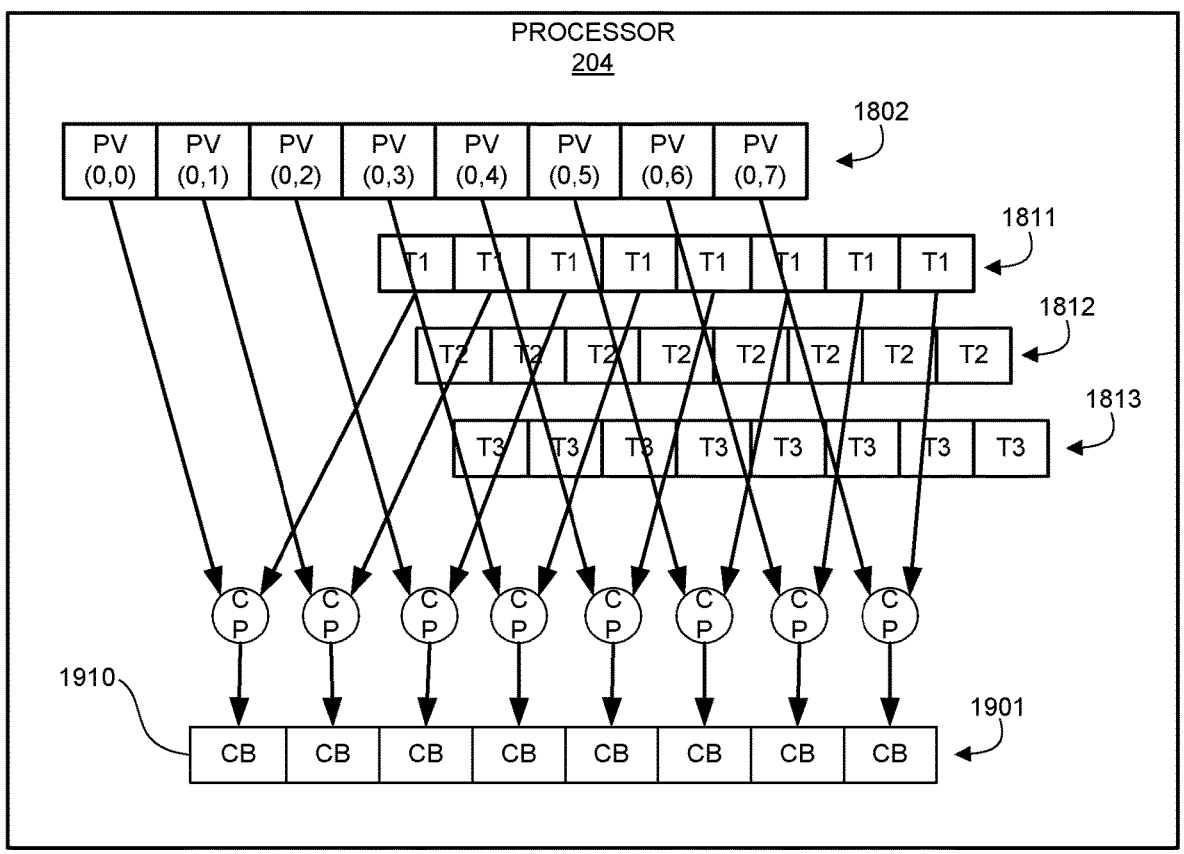
FIGS. 19-21 illustrate a vectorized comparison in an illustrative embodiment.
Figure 20:
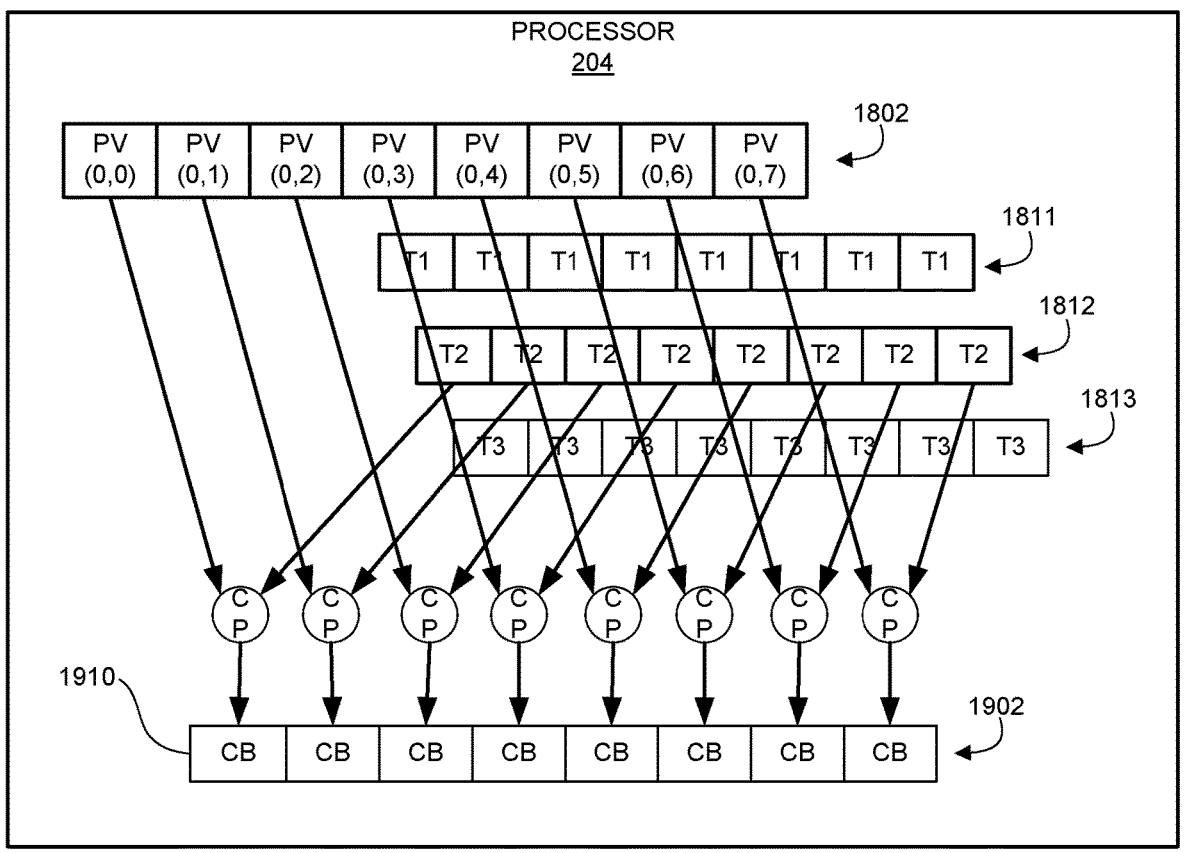
Figure 21:
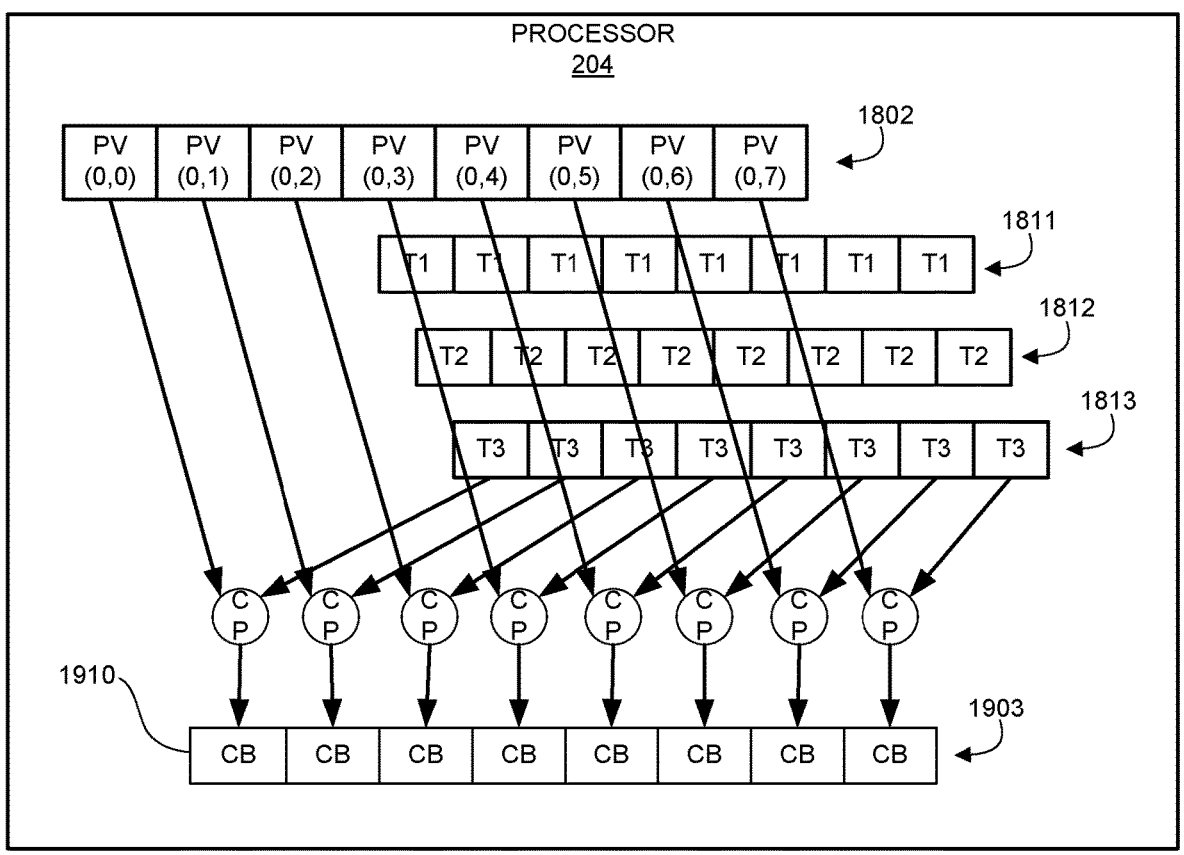

FIG. 18 is a schematic diagram of processor 204 with the set 1802 of pixel values 504 (PV) for block 1600 loaded in a local memory in an illustrative embodiment. FIG. 18 further illustrates a set 1811 of first threshold values (T1), a set 1812 of second threshold values (T2), and a set 1813 of third threshold values (T3) loaded in local memory. In this example, the set 1811 of first threshold values (T1) is used to distinguish a first intensity level and a second intensity level. The set 1812 of second threshold values (T2) is used to distinguish the second intensity level and a third intensity level. The set 1813 of third threshold values (T3) is used to distinguish the third intensity level and a fourth intensity level. Additional sets of threshold values may be loaded by processor 204 in cases of more than four intensity levels. In FIG. 15A, processor 204 performs a vectorized comparison of the set 1802 of pixel values (PV) to the threshold values, such as in sets 1811-1813 (step 1510). A vectorized comparison means that the set 1802 of pixel values (PV) is compared to a set 1811-1813 of threshold values at a time (e.g., a clock cycle). The set 1802 of pixel values (PV) and a set 1811-1813 of threshold values may be considered "vectors" where the same comparison operation is performed on both sets of values (one from each vector) at a time. It is also noted that the set 1802 of pixel values (PV) may be compared to each set 1811-1813 of threshold values simultaneously depending on the capability of processor 204. FIGS. 19-21 illustrate a vectorized comparison in an illustrative embodiment. In FIG. 19, processor 204 performs the vectorized comparison of the set 1802 of pixel values (PV) to the set 1811 of first threshold values to generate a first set 1901 of comparison bits (CB) 1910. A set of comparison bits represents the result of the comparison for each pixel value and threshold value. For example, if a pixel value is "220" and the threshold value is "64", then the comparison bit 1910 for that pixel may be "1". If the pixel value is "50" and the threshold value is "64", then the comparison bit 1910 for that pixel may be "0". In an embodiment, the first threshold values may be for a first or smallest droplet/dot size, which means that a pixel value that exceeds a first threshold value corresponds with at least the smallest droplet/dot size (i.e., the smallest droplet/dot size or a larger drop size).

In FIG. 20, processor 204 performs the vectorized comparison of the set 1802 of pixel values (PV) to the set 1812 of second threshold values to generate a second set 1902 of comparison bits (CB) 1910. In an embodiment, the second threshold values may be for a second droplet/dot size that is larger than the first droplet/dot size, meaning that a pixel value that exceeds a second threshold value corresponds with at least the second droplet/dot size (i.e., the second droplet/dot size or larger). In FIG. 21, processor 204 performs the vectorized comparison of the set 1802 of pixel values (PV) to the set 1813 of third threshold values to generate a third set 1903 of comparison bits (CB) 1910. In an embodiment, the third threshold values may be for a third droplet/dot size that is larger than the second droplet/dot size, meaning that a pixel value that exceeds a third threshold value corresponds with at least the third droplet/dot size (i.e., the third droplet/dot size or larger). Although the vectorized comparisons for the thresholds are shown in different figures, it is understood that the vectorized comparisons may be performed simultaneously within processor 204. Also, although vectorized comparisons are shown for three thresholds, processor 204 may perform vectorized comparisons for more or less thresholds depending on the number of intensity levels considered for the multi-level halftoning.

In FIG. 15A, the vectorized comparisons from step 1510 result in multiple sets of comparison bits 1910 (e.g., sets 1901-1903). For multi-level halftoning, there are three or more sets of comparison bits whenever four or more output levels are used. Processor 204 performs ternary logic operations on the sets 1901-1903 of comparison bits 1910 (step 1512). Ternary logic produces one output bit per three input bits. Thus, each one of the ternary logic operations outputs one bit of a pixel value for the halftoned image 222. For example, processor 204 may perform a first ternary logic operation (step 1514) to define a low-order bit (least significant bit) of a pixel value, and a second ternary logic operation (step 1516) to define the next higher-order bit of the pixel value. These ternary logic operations are performed to define the low-order bits and the higher-order bits for the pixels 502 in block 1600.

Figure 22:
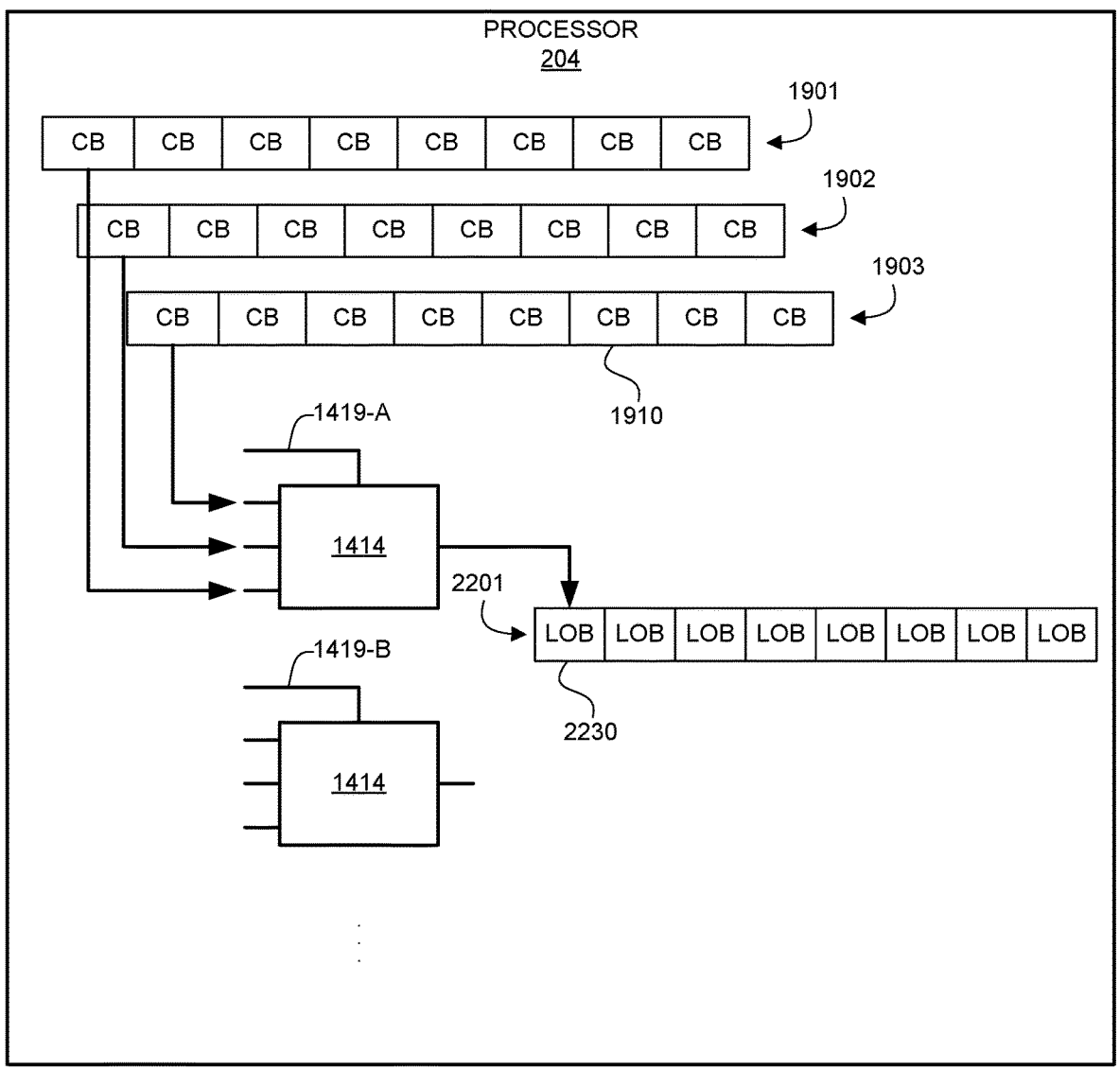
FIGS. 22-23 illustrate ternary logic operations in an illustrative embodiment.
Figure 23:
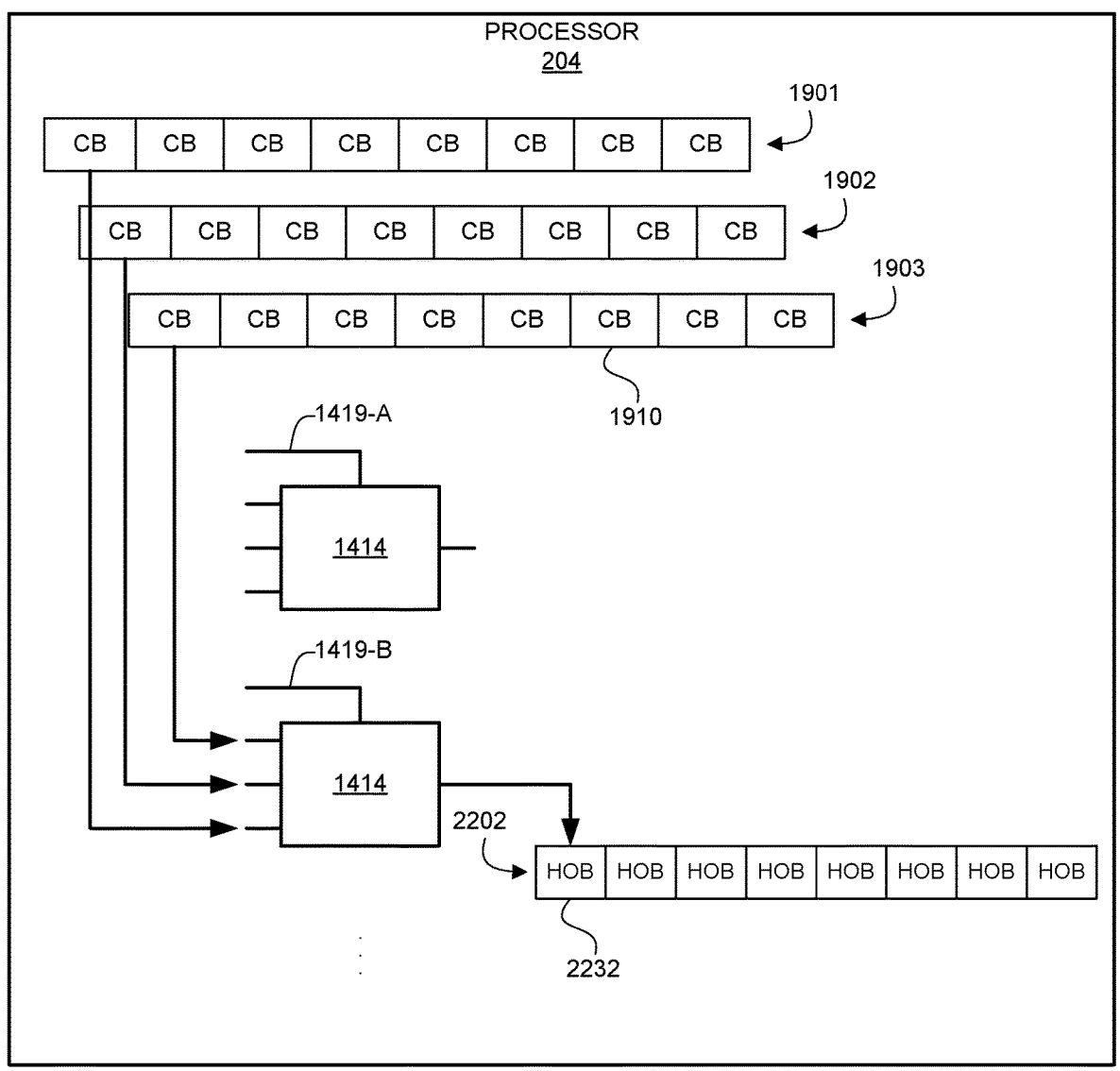

FIGS. 22-23 illustrate ternary logic operations in an illustrative embodiment. In FIG. 22, processor 204 performs a first ternary logic operation with the first set 1901 of comparison bits 1910, the second set 1902 of comparison bits 1910, and the third set 1903 of comparison bits 1910 as input. The first ternary logic operation outputs a set 2201 of low-order bits 2230 (LOB) for the block 1600 of the pixels 502. In FIG. 23, processor 204 performs a second ternary logic operation with the first set 1901 of comparison bits 1910, the second set 1902 of comparison bits 1910, and the third set 1903 of comparison bits 1910 as input. The second ternary logic operation outputs a set 2202 of higher-order bits 2232 (HOB) for the block 1600 of the pixels 502. For a two-bit halftoning process, the set 2202 of higher-order bits 2232 represents the most-significant bits of the pixel values. Although not explicitly shown in FIGS. 22-23, processor 204 may perform a ternary logic operation on each of the comparison bits 1910 in sets 1901-1903 at the same time or simultaneously within processor 204 (e.g., same clock cycle).

Figures 24, 25:
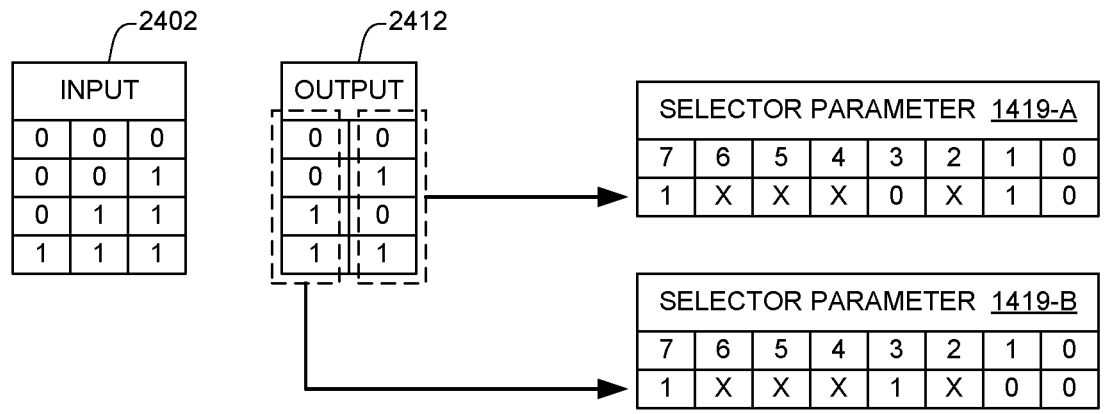

As stated above, there may be 256 possible ternary logic functions defined for ternary logic subsystems 1414. The selector parameters 1419-A/1419-B are computed for ternary logic subsystems 1414 to select the desired ternary logic functions for each bit plane 224. A selector parameter may be thought of as a lookup table. The three input bits form a number i between zero and seven. The $i^{th}$ bit of the selector parameter gives the output bit for the case of three input bits represented by i. FIG. 24 illustrates computing of selector parameters 1419-A/1419-B in an illustrative embodiment. The input table 2402 represents comparison bits 1910 arranged from right to left, such as from sets 1901-1903. The comparison bits 1910 resulting from the smallest threshold are on the right, and comparison bits 1910 resulting from the largest threshold are on the left. These bits are interpreted as a binary number between zero and seven. Not all numbers between zero and seven are needed for well-designed halftone threshold arrays, since the thresholds for smaller droplets/dots are always exceeded when the threshold for larger droplets/dots is exceeded. Accordingly, if there are four intensity levels, then the values that appear in input table 2402 are zero, one, three, and seven (i.e., "000", "001", "011", and "111"). Output table 2412 indicates the pixel value or pixel symbol desired when the input bits are as shown in input table 2402. For example, an input of "000" may be mapped to a pixel value of "00", an input of "001" may be mapped to a pixel value of "01", an input of "011" may be mapped to a pixel value of "10", and an input of "111" may be mapped to a pixel value of "11". However, any pixel value may be mapped to each possible set of input bits.

To compute a selector parameter 1419-A for the first bit plane 224 (i.e., for the low-order bits), we use the rightmost column of the output table 2412. Selector parameter 1419-A is an eight-bit value. According to the rightmost column, a value of "0" is mapped to an input of "000" (decimal value 0), so bit zero of the selector parameter 1419-A is set to "0". A value of "1" is mapped to an input of "001" (decimal value 1), so bit one of the selector parameter 1419-A is set to "1". A value of "0" is mapped to an input of "011" (decimal value 3), so bit three of the selector parameter 1419-A is set to "0". A value of "1" is mapped to an input of "111" (decimal value 7), so bit seven of the selector parameter 1419-A is set to "1". The other bits of the selector parameter 1419-A are set to a "don't care" value ("X"). Since the corresponding input bit patterns do not occur in well-designed halftone threshold arrays, these values will have no effect on the halftoned image. They may be thought of as values that will appear in the case of an error in the threshold array.

To compute a selector parameter 1419-B for the second bit plane 224 (i.e., for higher-order bits), we use leftmost column of the output table 2412. According to the leftmost column, a value of "0" is mapped to an input of "000" (decimal value 0), so bit zero of the selector parameter 1419-B is set to "0". A value of "0" is mapped to an input of "001" (decimal value 1), so bit one of the selector parameter 1419-B is set to "0". A value of "1" is mapped to an input of "011" (decimal value 3), so bit three of the selector parameter 1419-B is set to "1". A value of "1" is mapped to an input of "111" (decimal value 7), so bit seven of the selector parameter 1419-B is set to "1". The other bits of the selector parameter 1419-B are set to a "don't care" value ("X").

The ternary logic operations output a set 2201 of low-order bits 2230 for the block 1600 of pixels 502, and a set 2202 of higher-order bits 2232 for the block 1600 of pixels 502. Processor 204 may repeat the multi-level halftoning process on multiple blocks of pixels 502 defined within source image 218 in a similar manner. For example, if there is a determination (step 1517) that the multi-level halftoning process is performed on additional blocks 1600 of pixels 502, then method 1500 returns to step 1506 to identify a set of pixel values for another block 1600 of pixels 502.

Processor 204 is configured to generate a plurality of bit planes 224 representing the pixel values for halftoned image 222. For example, a two-bit (four level) output includes two bit planes 224: one for the low-order bits 2230, and one for the higher-order bits 2232 of each pixel 502. In FIG. 15B, processor 204 arranges one or more sets 2201 of the low-order bits 2230 in a first bit plane (step 1518). The first bit plane therefore represents the low-order bits 2230 for the pixels 502 of halftoned image 222. Processor 204 also arranges one or more sets 2202 of the higher-order bits 2232 in a second bit plane (step 1520). The second bit plane may therefore represent the next higher-order bits 2232 for the pixels 502 of halftoned image 222. Processor 204 may arrange one or more additional bit planes 224 depending on the number of bits used to define pixels values in halftoned image 222.

FIGS. 25-26 illustrate bit planes that define pixel values for halftoned image 222 in an illustrative embodiment. FIG. 25 illustrates the first bit plane 224-A representing the low-order bits 2230 (LOB) for one or more blocks of pixels 502. When performing the first ternary logic operation (step 1514), processor 204 generates a set 2201 of low-order bits 2230 for a block 1600 of pixels 502. Processor 204 arranges the set 2201 of low-order bits 2230 in bit plane 224-A so that each of the low-order bits 2230 defines part of a pixel value for its corresponding pixel 502. For example, set 2201 includes the low-order bits 2230 for pixels (0,0), (0,1), (0,2), etc. The low-order bits 2230 are illustrated as being arranged in rows and columns to depict how the low-order bits 2230 correspond to pixels 502. However, a bit plane 224 may have any desired structure that maps low-order bits 2230 to pixels 502. Processor 204 may arrange multiple sets 2201 of low-order bits 2230 in bit plane 224-A for multiple blocks 1600. Thus, bit plane 224-A may include the low-order bits 2230 for pixels 502 corresponding with a portion of a sheetside, a logical page on an N-up sheetside, a full sheetside, etc. Typically, pages to be imaged are combined into physical "sheetsides" that consist of one or more logical pages of equal length which when laid out for printing, span the width of the print web. The sheetside represents the image to be printed on a side of a sheet (or equivalent) of recording medium 132. FIG. 26 illustrates the second bit plane 224-B representing the higher-order bits 2232 (HOB) for one or more blocks of pixels 502. When performing the second ternary logic operation (step 1516), processor 204 generates a set 2202 of higher-order bits 2232 for a block 1600 of pixels 502. Processor 204 arranges the set 2202 of higher-order bits 2232 in bit plane 224-B so that each of the higher-order bits 2232 defines part of a pixel value for its corresponding pixel 502. For example, set 2202 includes higher-order bits 2232 for pixels (0,0), (0,1), (0,2), etc. Processor 204 may arrange multiple sets 2202 of higher-order bits 2232 in bit plane 224-B for multiple blocks 1600. Thus, bit plane 224-B may include higher-order bits 2232 for pixels corresponding with a portion of a sheetside, a logical page on an N-up sheetside, a full sheetside, etc. In one embodiment, each bit plane 224-A/224-B may include the bits of eight pixels in a byte.

Processor 204 may be configured to output bit planes 224 to print engine 120, print mechanism 126, or another subsystem. For example, print engine 120 may be configured to handle individual bit planes 224 for a printing operation. Thus, processor 204 may initiate transmission of the bit planes 224 (e.g., the first bit plane 224-A and the second bit plane 224-B) to a destination, such as print engine 120, print mechanism 126, or another subsystem (step 1522). For example, when halftone system 140 is implemented in print controller 114 of DFE 110 (see FIG. 1), processor 204 may access print engine interface 116 to transmit the bit planes 224 over communication link 117 to print engine 120. Print engine 120 may then initiate printing operations based on the bit planes 224. When halftone system 140 is implemented in print engine controller 124 of print engine 120, processor 204 may transmit the bit planes 224 to print mechanism 126, or to another subsystem within print engine controller 124 for further processing.

Figure 27:
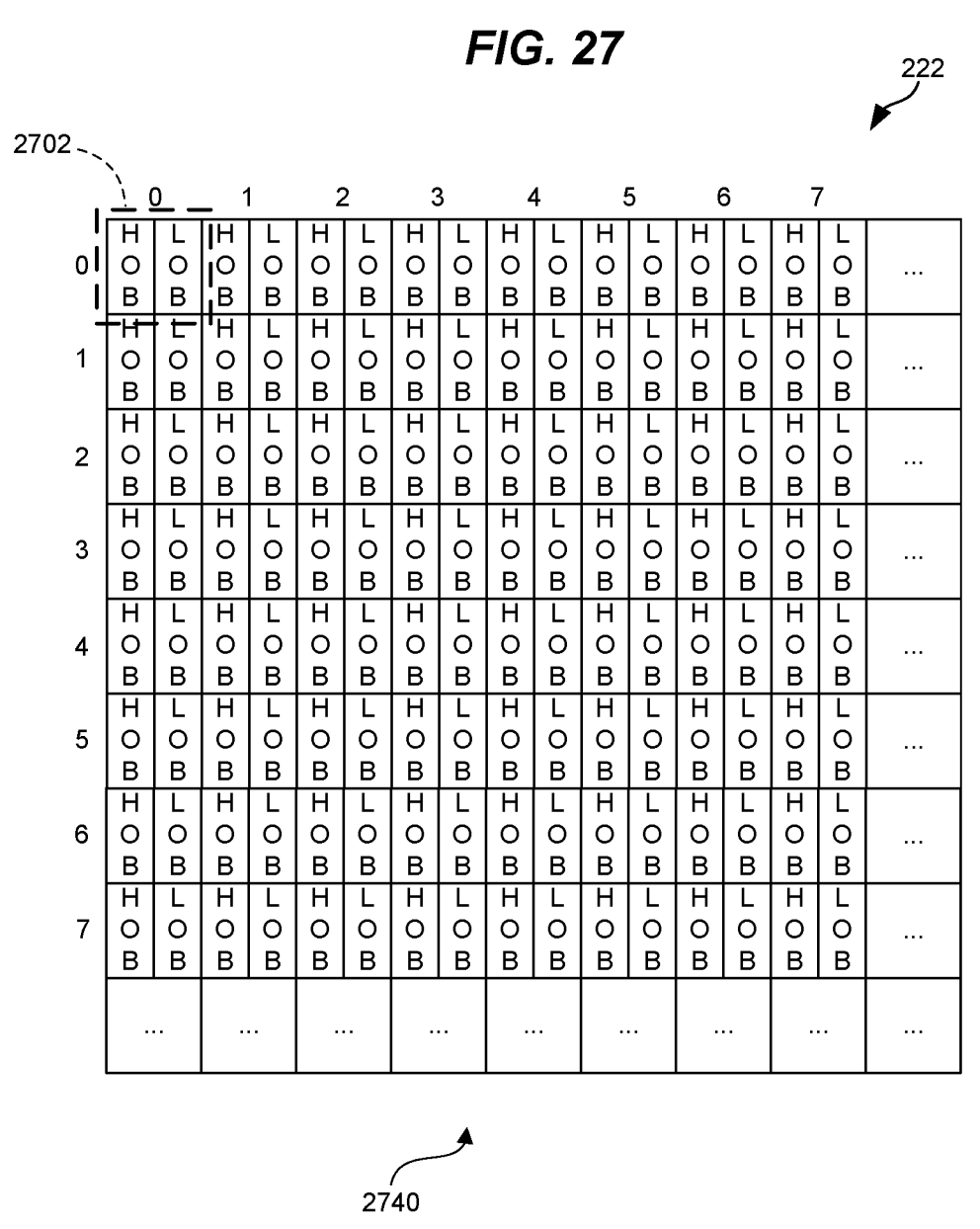

In another embodiment, print controller 114 and/or print engine controller 124 may be configured to output a bit field data structure. In this case, processor 204 may perform an interleave process to convert or merge the bit planes 224 into a bit field data structure of halftoned image 222 (step 1524). FIG. 27 illustrates halftoned image 222 with bit planes 224-A/224-B merged in an illustrative embodiment. Halftoned image 222 of FIG. 27 comprises a bit field data structure 2740 that represents an array of pixels 502 with pixel values (PV) in multi-bit bit fields 2702. The bit fields 2702 of halftoned image 222 are y-bit values, which are less than the x-bit values used in the source image 218. Processor 204 may then initiate transmission of the halftoned image 222 to a destination, such as print engine 120, print mechanism 126, or another subsystem (step 1526). For example, when halftone system 140 is implemented in print controller 114 of DFE 110 (see FIG. 1), processor 204 may access print engine interface 116 to transmit the halftoned image 222 over communication link 117 to print engine 120. Print engine 120 may then initiate printing operations based on the halftoned image 222. When halftone system 140 is implemented in print engine controller 124 of print engine 120, processor 204 may transmit the halftoned image 222 to print mechanism 126, or to another subsystem within print engine controller 124 for further processing.

The multi-level halftoning process described above is performed for a source image of a single color plane. For a CMYK color model, for example, method 1500 may be repeated to halftone source images for each of the color planes.

Some of the examples provided above illustrate halftoning for four intensity levels. However, the concepts described herein apply to three intensity levels, five intensity levels, six intensity levels, or more. The case of three intensity levels is treated in a similar way as four intensity levels, except the third threshold is set to zero. For the case of eight intensity levels, there are seven thresholds. The comparison bits 1910 resulting from a comparison of the pixel values and first threshold values, a second threshold values, and a third threshold values may be input to a first ternary logic operation to output one bit plane 224. The comparison bits 1910 resulting from a comparison of the pixel values and fifth threshold values, sixth threshold values, and seventh threshold values may be input to a second ternary logic operation to output another bit plane 224. The comparison bits 1910 resulting from a comparison of the pixel values and fourth threshold values may be output to yet another bit plane 224 (e.g., the most significant bit). The comparison of the fourth threshold values may also be used to select which ternary logic result is written to the least significant bit plane. The cases of five to seven intensity levels may be treated the same as eight intensity levels, except that the unused threshold values are treated as if they were zero.

Figure 28:
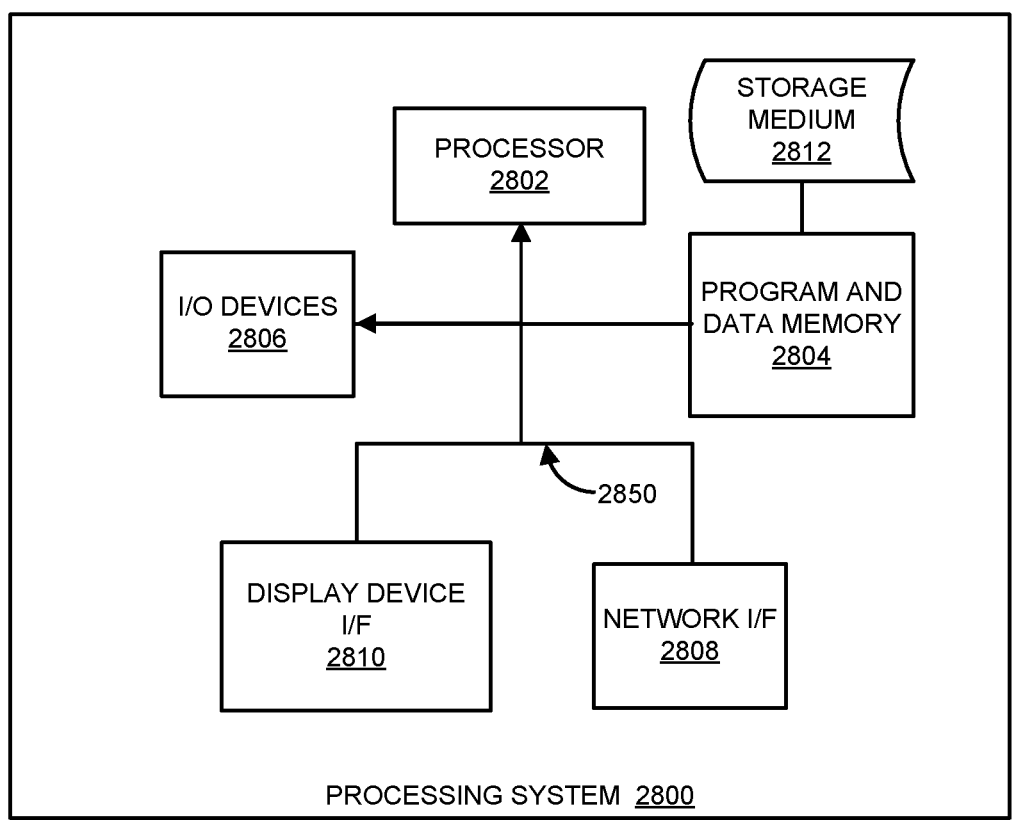
FIG. 28 illustrates a processing system operable to execute a computer readable medium embodying programmed instructions to perform desired functions in an illustrative embodiment.

Embodiments disclosed herein can take the form of software, hardware, firmware, or various combinations thereof. In one particular embodiment, software is used to direct a processing system of the image forming apparatus 100 to perform the various operations disclosed herein. FIG. 28 illustrates a processing system 2800 operable to execute a computer readable medium embodying programmed instructions to perform desired functions in an illustrative embodiment. Processing system 2800 is operable to perform the above operations by executing programmed instructions tangibly embodied on computer readable storage medium 2812. In this regard, embodiments can take the form of a computer program accessible via computer-readable medium 2812 providing program code for use by a computer or any other instruction execution system. For the purposes of this description, computer readable storage medium 2812 can be anything that can contain or store the program for use by the computer.

Computer readable storage medium 2812 can be an electronic, magnetic, optical, electromagnetic, infrared, or semiconductor device. Examples of computer readable storage medium 2812 include a solid-state memory, a magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

Processing system 2800, being suitable for storing and/or executing the program code, includes at least one processor 2802 coupled to program and data memory 2804 through a system bus 2850. Program and data memory 2804 can include local memory employed during actual execution of the program code, bulk storage, and cache memories that provide temporary storage of at least some program code and/or data in order to reduce the number of times the code and/or data are retrieved from bulk storage during execution.

I/O devices 2806 (including but not limited to keyboards, displays, pointing devices, etc.) can be coupled either directly or through intervening I/O controllers. Network adapter interfaces 2808 may also be integrated with the system to enable processing system 2800 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 2810 may be integrated with the system to interface to one or more display devices, such as printing systems and screens for presentation of data generated by processor 2802.

Although specific embodiments are described herein, the scope of the disclosure is not limited to those specific embodiments. The scope of the disclosure is defined by the following claims and any equivalents thereof.

What is claimed is:

1. A halftone system, comprising:
at least one processor; and
a memory configured to store a threshold array comprising an array of threshold elements;
the memory including computer program code executable by the processor to cause the halftone system at least to:
receive a source image comprising an array of pixels with pixel values; and
perform a multi-level halftoning process on the source image by:
partitioning the source image into a sequence of image segments;
partitioning the threshold array into a plurality of threshold segments;
identifying image segment groups each comprising a set of the image segments that are noncontiguous in the sequence and correspond with a mutual threshold segment of the threshold array; and
scheduling processing of the image segments in an image segment group as a batch based on the mutual threshold segment.

2. The halftone system of claim 1 wherein the processor further causes the halftone system at least to:
fetch the mutual threshold segment for the image segment group from the memory into a cache; and
schedule processing of the image segments in the image segment group in order with the mutual threshold segment loaded in the cache.

3. The halftone system of claim 1 wherein:
a height of the threshold array is greater than a height of the image segments.

4. The halftone system of claim 3 wherein:
the height of the threshold array is a multiple of the height of the image segments.

5. The halftone system of claim 1 wherein:
a width of the threshold array is equal to a width of the source image.

6. The halftone system of claim 1 wherein:
a width of the threshold array is greater than or equal to a printable width of a printhead assembly.

7. The halftone system of claim 1 wherein:
the threshold elements comprise a plurality of threshold values defined to distinguish different intensity levels.

8. The halftone system of claim 1 wherein:
a size of each of the threshold segments is less than or equal to a capacity of cache memory for the processor.

9. An image forming apparatus, comprising:
the halftone system of claim 1.

10. A method of halftoning, the method comprising:
storing, in memory, a threshold array comprising an array of threshold elements;
receiving a source image comprising an array of pixels with pixel values; and
performing a multi-level halftoning process on the source image by:
partitioning the source image into a sequence of image segments;
partitioning the threshold array into a plurality of threshold segments;
identifying image segment groups each comprising a set of the image segments that are noncontiguous in the sequence and correspond with a mutual threshold segment of the threshold array; and
scheduling processing of the image segments in an image segment group as a batch based on the mutual threshold segment.

11. The method of claim 10 wherein the scheduling comprises:
fetching the mutual threshold segment for the image segment group from the memory into a cache; and
scheduling the processing of the image segments in the image segment group in order with the mutual threshold segment loaded in the cache.

12. The method of claim 10 wherein:
a height of the threshold array is greater than a height of the image segments.

13. The method of claim 12 wherein:
the height of the threshold array is a multiple of the height of the image segments.

14. The method of claim 10 wherein:
a width of the threshold array is equal to a width of the source image.

15. The method of claim 10 wherein:
a width of the threshold array is greater than or equal to a printable width of a printhead assembly.

16. The method of claim 10 wherein:
the threshold elements comprise a plurality of threshold values defined to distinguish different intensity levels.

17. The method of claim 10 wherein:
the multi-level halftoning process is performed by a processor; and
a size of each of the threshold segments is less than or equal to a capacity of cache memory for the processor.

18. The method of claim 10 wherein:
the method is performed in an image forming apparatus.

19. A non-transitory computer readable medium embodying programmed instructions which, when executed by a processor, are operable for performing a method of halftoning, the method comprising:
storing, in memory, a threshold array comprising an array of threshold elements;
receiving a source image comprising an array of pixels with pixel values; and
performing a multi-level halftoning process on the source image by:
partitioning the source image into a sequence of image segments;
partitioning the threshold array into a plurality of threshold segments;
identifying image segment groups each comprising a set of the image segments that are noncontiguous in the sequence and correspond with a mutual threshold segment of the threshold array; and
scheduling processing of the image segments in an image segment group as a batch based on the mutual threshold segment.

20. The computer readable medium of claim 19 wherein the scheduling comprises:
fetching the mutual threshold segment for the image segment group from the memory into a cache; and
scheduling the processing of the image segments in the image segment group in order with the mutual threshold segment loaded in the cache.

* * * * *